United States Patent
Sukegawa et al.

(10) Patent No.: US 11,124,593 B2
(45) Date of Patent: Sep. 21, 2021

(54) MODIFIED BLOCK COPOLYMER, METHOD FOR PRODUCING MODIFIED BLOCK COPOLYMER, AND RESIN COMPOSITION

(71) Applicant: Asahi Kasei Kabushiki Kaisha, Tokyo (JP)

(72) Inventors: Takashi Sukegawa, Tokyo (JP); Masashi Yamamoto, Tokyo (JP); Yasuhiro Kusanose, Tokyo (JP)

(73) Assignee: Asahi Kasei Kabushiki Kaisha, Tokyo (JP)

( * ) Notice: Subject to any disclaimer, the term of this patent is extended or adjusted under 35 U.S.C. 154(b) by 64 days.

(21) Appl. No.: 16/612,775

(22) PCT Filed: May 8, 2018

(86) PCT No.: PCT/JP2018/017821
§ 371 (c)(1),
(2) Date: Nov. 12, 2019

(87) PCT Pub. No.: WO2018/207784
PCT Pub. Date: Nov. 15, 2018

(65) Prior Publication Data
US 2020/0199282 A1 Jun. 25, 2020

(30) Foreign Application Priority Data
May 12, 2017 (JP) .............................. JP2017-095959

(51) Int. Cl.
*C08F 297/04* (2006.01)
*C08L 53/02* (2006.01)
*C08L 75/04* (2006.01)

(52) U.S. Cl.
CPC .......... *C08F 297/04* (2013.01); *C08L 53/025* (2013.01); *C08L 75/04* (2013.01); *C08L 2205/03* (2013.01)

(58) Field of Classification Search
CPC ........ C08F 8/32; C08F 297/04; C08F 222/06; C08F 296/04
See application file for complete search history.

(56) References Cited

U.S. PATENT DOCUMENTS

| | | | |
|---|---|---|---|
| 5,373,065 A | 12/1994 | Kitazawa et al. | |
| 5,429,758 A | * 7/1995 | Hayashi | C10M 145/10 508/306 |
| 5,623,019 A | 4/1997 | Wiggins et al. | |
| 2003/0216507 A1 | 11/2003 | Masubuchi | |
| 2004/0176514 A1 | 9/2004 | Kubo et al. | |
| 2018/0118870 A1* | 5/2018 | Sakamoto | C08G 18/7671 |

FOREIGN PATENT DOCUMENTS

| | | |
|---|---|---|
| EP | 558047 A2 | 9/1992 |
| JP | S58-040350 A | 3/1983 |
| JP | H04-296308 A | 10/1992 |
| JP | H05-032716 A | 2/1993 |
| JP | H05-239136 A | 9/1993 |
| JP | H06-001816 A | 1/1994 |
| JP | H06-322259 A | 11/1994 |
| JP | H07-026072 A | 1/1995 |
| JP | 2002-201333 A | 7/2002 |
| JP | 2003-327822 A | 11/2003 |
| JP | 2003-342467 A | 12/2003 |
| JP | 2004-059781 A | 2/2004 |
| JP | 2004-059817 A | 2/2004 |
| JP | 2004-182916 A | 7/2004 |
| JP | 2009-242463 A | 10/2009 |
| JP | 2016-222932 A | 12/2016 |
| JP | 6332279 B2 | 5/2018 |
| WO | 2016/173961 A1 | 11/2016 |
| WO | 2015/046392 A1 | 3/2017 |

OTHER PUBLICATIONS

International Search Report issued in corresponding International Patent Application No. PCT/JP2018/017821 dated Jul. 24, 2018.
International Preliminary Report on Patentability and Written Opinion issued in corresponding International Patent Application No. PCT/JP2018/017821 dated Nov. 12, 2019.
European Search Report issued in corresponding European Patent Application No. 18798411.7 dated May 25, 2020.

* cited by examiner

*Primary Examiner* — Mark S Kaucher
(74) *Attorney, Agent, or Firm* — Morgan, Lewis & Bockius LLP

(57) ABSTRACT

A modified block copolymer according to the present invention is a modified block copolymer comprising a polymer block comprising a vinyl aromatic compound as a main constituent (A), a polymer block comprising a conjugate diene compound as a main constituent (B), and an atomic group having NHx (x=0 to 2) (C). In the modified block copolymer, the polymer block comprising a conjugate diene compound as a main constituent (B) is a hydrogenated product, the atomic group having NHx (x=0 to 2) (C) is contained in a side chain, and a compound forming the atomic group having NHx (x=0 to 2) (C).

15 Claims, No Drawings

MODIFIED BLOCK COPOLYMER, METHOD FOR PRODUCING MODIFIED BLOCK COPOLYMER, AND RESIN COMPOSITION

TECHNICAL FIELD

The present invention relates to a modified block copolymer, a method for producing a modified block copolymer, and a resin composition.

BACKGROUND ART

Block copolymers having vinyl aromatic-based blocks and conjugate diene-based blocks exhibit various properties depending on the proportion and arrangement, the degree of hydrogenation, and the like of the blocks. In order to impart additional properties thereto, modified block copolymers containing a modified group have been suggested conventionally.

For example, Patent Literature 1 suggests a modified block copolymer in which an amino-group containing compound has been reacted with terminals of a block copolymer.

Modified block copolymers, which are excellent in compatibility with polar resins based on the reactivity of a modified group and the intermolecular interaction such as hydrogen bonds, are used as materials for modifying polar resins. One of polar resins to be modified is a thermoplastic polyurethane (hereinafter sometimes referred to as a "TPU").

For example, Patent Literature 2 suggests a technique for modifying a polar resin with a modified block copolymer.

Modified block copolymers are also contemplated to be used as compatibilizers for polymer-alloying of a polar resin and a non-polar resin.

For example, Patent Literature 3 suggests a polymer alloy of a polyamide and a polyolefin, wherein a modified block copolymer is used as a compatibilizer.

CITATION LIST

Patent Literature

Patent Literature 1: Japanese Patent Laid-Open No. 2004-59817
Patent Literature 2: Japanese Patent Laid-Open No. 2009-242463
Patent Literature 3: Japanese Patent Laid-Open No. 2016-222932

SUMMARY OF INVENTION

Technical Problem

A polymer alloy composed of a thermoplastic polyurethane (TPU) and a polyolefin has been contemplated in order to achieve lower cost and lighter weight as the main purposes.

An alloy of the TPU and polyolefin is required to achieve lower cost and lighter weight while abrasion resistance and mechanical strength, which are features of polyurethane, are maintained in a balanced manner.

In the conventional art, however, there is a problem in that the compatibility between the TPU and polyolefin has not been sufficiently examined.

In view of the above problem of the conventional art, an object of the present invention is to provide a modified block copolymer suitable as a compatibilizer for a TPU and a polyolefin, and a resin composition obtained by using the modified block copolymer as a compatibilizer.

Solution to Problem

The present inventors have made extensive investigations to solve the above problem and, as a result, have found that a modified block copolymer having a specific amine-modified group and a resin composition of a TPU and a polyolefin obtained by using the copolymer as a compatibilizer can solve the above problem, having completed the present invention.

That is, the present invention is as follows.
[1]
A modified block copolymer comprising:
a polymer block comprising a vinyl aromatic compound as a main constituent (A),
a polymer block comprising a conjugate diene compound as a main constituent (B), and
an atomic group having NHx (x=0 to 2) (C), wherein
the polymer block comprising a conjugate diene compound as a main constituent (B) is a hydrogenated product,
the atomic group having NHx (x=0 to 2) (C) is contained in a side chain, and
a compound forming the atomic group having NHx (x=0 to 2) (C) satisfies the following condition:
Condition: when the compound forming the atomic group having NHx (x=0 to 2) (C) is reacted with a maleic anhydride-modified group in a maleic anhydride-modified block copolymer, a MFR value at 230° C. under a load of 2.16 kg of the modified block copolymer after the reaction is 0.1 times or more a MFR value at 230° C. under a load of 2.16 kg of the maleic anhydride-modified block copolymer before the reaction.
[2]
The modified block copolymer according to [1], wherein the number of the atomic group having NHx (x=0 to 2) (C) per polymerized chain exceeds 1.
[3]
The modified block copolymer according to [1] or [2], wherein
the atomic group having NHx (x=0 to 2) (C) has a structure of X—R1-NH—R2,
R1 is a C2-C22 substituted or unsubstituted, saturated or unsaturated hydrocarbon group,
R2 is a C2-C13 substituted or unsubstituted, saturated or unsaturated hydrocarbon group, and
X has a structure in which a carbon-carbon unsaturated bond forms a chemical bond with the polymer block (A) and/or the polymer block (B) via graft modification.
[4]
The modified block copolymer according to any of [1] to [3], wherein
a content of the polymer block comprising a vinyl aromatic compound as a main constituent (A) is 1 to 70% by mass, and
an amount of vinyl bonds before hydrogenation of the polymer block comprising a conjugate diene compound as a main constituent (B) is 20 to 100 mol %.
[5]
The modified block copolymer according to any of [1] to [4], wherein a hydrogenation rate of the polymer block comprising a conjugate diene compound as a main constituent (B) is 40 to 100 mol %.
[6]
The modified block copolymer according to any of [1] to [5], wherein a butylene content and/or a propylene content is 25 to 100 mol % based on 100 mol % in total of a conjugate diene compound unit(s).

[7]

The modified block copolymer according to any of [1] to [6], wherein the atomic group having NHx (x=0 to 2) (C) is bonded to the polymer block comprising a vinyl aromatic compound as a main constituent (A) and/or the polymer block comprising a conjugate diene compound as a main constituent (B) via an imide group and/or an amide group contained in the atomic group (C).

[8]

The modified block copolymer according to any of [1] to [7], wherein the compound having NHx (x=0 to 2) that forms the atomic group having NHx (x=0 to 2) (C) satisfies the following condition:

Condition: when a maleic anhydride modified group in a maleic anhydride-modified block copolymer is reacted with an equimolar amount of $H_2N$—R—NHx (x=0 to 2, R is a C2-C22 substituted or unsubstituted, saturated or unsaturated hydrocarbon group), which is the compound having NHx (x=0 to 2), the MFR value at 230° C. under a load of 2.16 kg of the modified block copolymer after the reaction is 0.1 times or more the MFR value at 230° C. under a load of 2.16 kg of the maleic anhydride-modified block copolymer before the reaction.

[9]

The modified block copolymer according to any of [1] to [8], wherein the atomic group having NHx (x=0 to 2) (C) has a structure of X—R1-NH—R2, R1 is a C2-C22 hydrocarbon group, the C2-C22 hydrocarbon group being a substituted or unsubstituted, saturated or unsaturated hydrocarbon group, R2 is a C2-C13 hydrocarbon group, the C2-C13 hydrocarbon group being a substituted or unsubstituted, saturated or unsaturated hydrocarbon group, and X has a structure in which a vinyl or an α,β-unsaturated carboxylic acid derivative forms a chemical bond with the polymer block (A) and/or the polymer block (B) via graft modification.

[10]

A method for producing the modified block copolymer according to any of [1] to [9], comprising:

a step of graft-adding an α,β-unsaturated carboxylic acid and/or a derivative thereof to a block copolymer having a polymer block comprising a vinyl aromatic compound as a main constituent (A) and a polymer block comprising a conjugate diene compound as a main constituent (B); and a step of reacting an asymmetric diamine with the α,β-unsaturated carboxylic acid and/or a derivative thereof.

[11]

The method for producing the modified block copolymer according to [10], wherein one terminal of the asymmetric diamine is a secondary amine.

[12]

The method for producing the modified block copolymer according to [11], wherein a substituent of the secondary amine is a C2 or higher substituted or unsubstituted, saturated or unsaturated hydrocarbon group.

[13]

A resin composition comprising the modified block copolymer according to any of [1] to [9] and a thermoplastic polyurethane.

[14]

The resin composition according to [13], comprising:

1 to 70% by mass of the modified block copolymer according to any of [1] to [9] and 30 to 99% by mass of the thermoplastic polyurethane.

[15]

A resin composition comprising:

the modified block copolymer according to any of [1] to [9], the thermoplastic polyurethane, and a polyolefin.

[16]

The resin composition according to [15], comprising:

1 to 98% by mass of the modified block copolymer according to any of [1] to [9], 1 to 98% by mass of the thermoplastic polyurethane, and 1 to 98% by mass of the polyolefin.

[17]

A resin composition comprising:

1 to 98% by mass of a modified block copolymer comprising a polymer block comprising a vinyl aromatic compound as a main constituent (A), a polymer block comprising a conjugate diene compound as a main constituent (B), and an atomic group (C) having NHx (x=1), 1 to 98% by mass of a thermoplastic polyurethane, and 1 to 98% by mass of a polyolefin, wherein the polymer block comprising a conjugate diene compound as a main constituent (B) is a hydrogenated product, the atomic group having NHx (x=1) (C) has a structure of X—R1-NH—R2, R1 is a C2-C22 substituted or unsubstituted, saturated or unsaturated hydrocarbon group, R2 is a C2-C13 substituted or unsubstituted, saturated or unsaturated hydrocarbon group, X has a structure in which a carbon-carbon unsaturated bond forms a chemical bond with the polymer block (A) and/or the polymer block (B) via graft modification, and a compound having NHx (x=0 to 2) that forms the atomic group having NHx (x=0 to 2) (C) satisfies the following condition:

Condition: when a maleic anhydride modified group in a maleic anhydride-modified block copolymer is reacted with an equimolar amount of $H_2N$—R—NHx (x=0 to 2, R is a C2-C22 substituted or unsubstituted, saturated or unsaturated hydrocarbon group), which is the compound having NHx (x=0 to 2), a MFR value at 230° C. under a load of 2.16 kg of the modified block copolymer after the reaction is 0.1 times or more a MFR value at 230° C. under a load of 2.16 kg of the maleic anhydride-modified block copolymer before the reaction.

Advantageous Effect of Invention

According to the present invention, it is possible to provide a modified block copolymer having an amine-modified group, and a resin composition of a TPU and a polyolefin, wherein the balance between abrasion resistance and mechanical strength has been improved by use of the block copolymer as a compatibilizer, in comparison with the case where a block copolymer not containing an atomic group having NHx (x=0 to 2) (C) is used as a compatibilizer.

DESCRIPTION OF EMBODIMENT

Hereinafter a mode for carrying out the present invention (hereinafter referred to as "the present embodiment") will be described in detail. The following present embodiment is provided for illustrating the present invention and is not intended to limit the present invention to the contents below. The present invention can be properly modified and implemented without departing from the gist.

[Modified Block Copolymer]

A modified block copolymer of the present embodiment is a modified block copolymer that includes a polymer block comprising a vinyl aromatic compound as a main constituent (A), a polymer block comprising a conjugate diene compound as a main constituent (B), and an atomic group having NHx (x=0 to 2) (C), wherein the polymer block comprising a conjugate diene compound as a main constituent (B) is a hydrogenated product, the atomic group having NHx (x=0 to 2) (C) is contained in a side chain, and a compound forming the atomic group having NHx (x=0 to 2) (C) satisfies the following condition: (Condition):

when the compound forming the atomic group having NHx (x=0 to 2) (C) is reacted with a maleic anhydride-modified group in a maleic anhydride-modified block copolymer, the MFR value at 230° C. under a load of 2.16 kg of the modified block copolymer after the reaction is 0.1 times or more the MFR value at 230° C. under a load of 2.16 kg of the maleic anhydride-modified block copolymer before the reaction.

Herein, "comprising . . . as a main constituent" refers to containing an intended monomer unit in an amount of 60% by mass or more in an intended polymer block.

From the viewpoint of the compatibility of the modified block copolymer of the present embodiment with a polyolefin and the strength, the content of the conjugate diene compound monomer unit in the polymer block comprising a conjugate diene compound as a main constituent (B) is preferably 70% by mass or more, more preferably 80% by mass or more, further preferably 90% by mass or more.

From the viewpoint of the strength of a molded body of a composition of the modified block copolymer of the present embodiment and a thermoplastic polyurethane (TPU) (hereinafter sometimes referred to as the TPU resin composition), the content of the vinyl aromatic compound monomer unit in the polymer block comprising a vinyl aromatic compound as a main constituent (A) is preferably 70% by mass or more, more preferably 80% by mass or more, further preferably 90% by mass or more.

In the modified block copolymer of the present embodiment, the content of the polymer block comprising a vinyl aromatic compound as a main constituent (A) is preferably 1 to 70% by mass from the viewpoint of the compatibility with a polyolefin and the mechanical strength of a molded body of the TPU resin composition.

The content of the polymer block comprising a vinyl aromatic compound as a main constituent (A) is more preferably 3 to 50% by mass, further preferably 5 to 35% by mass.

The content of the polymer block comprising a vinyl aromatic compound as a main constituent (A) can be measured using a nuclear magnetic resonator (NMR) or the like, and specifically can be calculated by a method described in Examples described below.

The content of the polymer block comprising a vinyl aromatic compound as a main constituent (A) can be controlled by adjusting the type and amount to be added of monomers in the polymerization step of the modified block copolymer.

In the present embodiment, the amount of vinyl bonds before hydrogenation of the polymer block comprising a conjugate diene compound as a main constituent (B) is preferably 20 to 100 mol % from the viewpoint of the flowability and the compatibility with a polyolefin.

The "amount of vinyl bonds before hydrogenation" refers to the amount of 1,2-bonds (mol %) based on the total amount of 1,4-bonds (cis and trans) and 1,2-bonds (in the case where incorporated as 3,4-bonds in the polymer, the total amount of 1,2-bonds and 3,4-bonds is referred to), derived from the conjugate diene compound incorporated in the polymer before hydrogenation.

The amount of vinyl bonds before hydrogenation in the polymer block comprising a conjugate diene compound as a main constituent (B) is more preferably 30 to 90 mol %, further preferably 35 to 80 mol %.

The amount of vinyl bonds in the modified block copolymer can be measured using a nuclear magnetic resonator (NMR) or the like, and specifically can be measured by a method described in Examples described below.

The amount of vinyl bonds can be controlled within the above-described numerical range using a Lewis base, for example, a compound such as an ether and amine as an agent for adjusting the amount of vinyl bonds (hereinafter referred to as a vinylation reagent).

In the modified block copolymer of the present embodiment, the hydrogenation rate of the polymer block comprising a conjugate diene compound as a main constituent (B) is 0 to 100 mol %. From the viewpoint of the compatibility with a polyolefin, the polymer block (B) is preferably a hydrogenated product. The hydrogenation rate is preferably 40 to 100 mol %, more preferably 70 to 100 mol %, further preferably 80 to 100 mol %, still more preferably 90 to 100 mol % further from the viewpoint of the heat resistance.

The hydrogenation rate of the modified block copolymer can be measured by a method described in Examples using a nuclear magnetic resonator (NMR) or the like.

The hydrogenation rate can be controlled within the above-described numerical range by adjusting the amount of hydrogen during hydrogenation, for example.

In the modified block copolymer of the present embodiment, the butylene content and/or the propylene content is preferably 25 to 100 mol % based on 100 mol % in total of the conjugate diene compound unit(s) from the viewpoint of the flowability and the compatibility with a polyolefin. The butylene content and/or the propylene content is preferably 29 to 99 mol %, more preferably 31 to 98 mol %.

The butylene content and/or the propylene content can be measured using a nuclear magnetic resonator (NMR) or the like, and specifically can be measured by a method described in Examples described below.

The butylene content and/or the propylene content based on 100 mol % in total of the conjugate diene compound unit(s) can be controlled by adjusting the type of monomers, and the amount of vinyl bonds and hydrogenation rate of the block copolymer.

In the present embodiment, examples of the vinyl aromatic compound to be contained in the polymer block comprising a vinyl aromatic compound as a main constituent (A) include, but are not limited to, vinyl aromatic compounds such as styrene, α-methylstyrene, p-methylstyrene, divinylbenzene, 1,1-diphenylethylene, N,N-dimethyl-p-aminoethylstyrene, and N,N-diethyl-p-aminoethylstyrene.

Of these, from the viewpoint of availability and productivity, styrene, α-methylstyrene, and 4-methylstyrene are preferably exemplified, and styrene is more preferred.

The polymer block comprising a vinyl aromatic compound as a main constituent (A) may be constituted by one vinyl aromatic compound unit or may be constituted by two or more vinyl aromatic compound units.

In the present embodiment, the conjugate diene compound contained in the polymer block comprising a conjugate diene compound as a main constituent (B) is a diolefine having a pair of conjugated double bonds. Examples of the diolefin include, but are not limited to, 1,3-butadiene, 2-methyl-1,3-butadiene (isoprene), 2,3-dimethyl-1,3-butadiene, 1,3-pentadiene, 2-methyl-1,3-pentadiene, 1,3-hexadiene, and farnesene.

Of these, from the viewpoint of availability and productivity, 1,3-butadiene and isoprene are preferably exemplified.

The polymer block comprising a conjugate diene compound as a main constituent (B) may be constituted by one conjugate diene compound unit or may be constituted by two or more conjugate diene compound units.

In the modified block copolymer of the present embodiment, in addition to the conjugate diene monomer and the vinyl aromatic monomer, other monomers copolymerizable with a conjugate diene monomer and a vinyl aromatic monomer can be used.

The melt flow rate (MFR; 230° C., load: 2.16 kg, in accordance with ISO1133) of the modified block copolymer of the present embodiment is preferably in the range of 0.1 to 50 g/10 minutes, more preferably in the range of 0.5 to 30 g/10 minutes, further preferably in the range of 1.0 to 25 g/10 minutes, from the viewpoint of the processability and the like of a TPU resin composition to be obtained.

The modified block copolymer of the present embodiment is not particularly limited as long as the copolymer satisfies the condition in the present embodiment, and those having any structure may be used.

Examples of the fundamental structure of the modified block copolymer of the present embodiment are structures represented by the following general formula.

Note that, in the following general formula, the fundamental structure is represented by a block (A) and a block (B) and description of the atomic group (C) is omitted.

A-(B-A)$_n$

B-(A-B)$_n$ (A-B)$_n$ (A-B)$_m$—X$^1$ (B-A)$_m$-X$^1$

In the general formula, A is a polymer block comprising a vinyl aromatic compound as a main constituent (A), and when a plurality of A's is present, A's may be the same or different.

B is a polymer block comprising a conjugate diene compound as a main constituent (B), and when a plurality of B's is present, B's may be the same or different.

n represents an integer of 1 or more, preferably an integer of 1 to 3.

m represents an integer of 2 or more, preferably an integer of 2 to 6.

X$^1$ represents a coupling agent residue or a polyfunctional initiator residue.

The fundamental structure of the modified block copolymer of the present embodiment is particularly preferably a polymer represented by structural formulas of A-B-A and A-B-A-B.

The modified block copolymer of the present embodiment has an atomic group having NHx (x=0 to 2) (C) added to the block A and/or B in the general formula described above.

The modified block copolymer of the present embodiment preferably has more than one atomic groups having NHx (x=0 to 2) (C) per polymerized chain from the viewpoint of the compatibility with another resin due to formation of a reaction point or interaction point.

The "one polymerized chain" herein is one polymer chain of the modified block copolymer. When the modified block copolymer contains a coupling product, the coupling product is also recognized as one polymer chain. That is, in the case of a coupling product, an entire polymer including a plurality of polymer chains and a coupling residue is taken as "one polymerized chain".

From the viewpoint of improvements in mechanical physical properties caused by enhancement in the compatibility with a polar resin and enhancement in the interface strength, the modified block copolymer preferably includes a plurality of modified groups. Also from the viewpoint of enhancement in the interface strength caused by an anchor effect in the case where the modified block copolymer of the present embodiment is used as the compatibilizer of a resin composition, the modified block copolymer side chain preferably includes a plurality of modified groups.

The number of the atomic group having NHx (x=0 to 2) (C) per polymerized chain is more preferably 1.2 or more, further preferably 1.5 or more. When modified groups are introduced to polymer terminals, the number of the modified groups is limited to the number of the polymer terminals or less, but allowing a polymer side chain to have the atomic group having NHx (x=0 to 2) (C) enables modified groups to be introduced without depending on the number of polymer terminals. For this reason, a plurality of modified groups can be introduced irrespective of the form of the polymer, and the polymers are designed more freely.

The number of the "atomic groups having NHx (x=0 to 2) (C)" per polymerized chain can be controlled by adjusting the amount of the modifier for the block copolymer.

The weight average molecular weight (Mw) (hereinafter also referred to as "Mw") of the modified block copolymer of the present embodiment is preferably 30,000 to 300,000, more preferably 40,000 to 270,000, further preferably 50,000 to 250,000 from the viewpoint of mechanical strength, flowability, abrasion resistance, and compatibility.

The weight average molecular weight (Mw) of the modified block copolymer of the present embodiment is a weight average molecular weight (Mw) determined from the molecular weights of peaks of a chromatogram obtained by GPC measurement based on a calibration curve obtained by measurement on commercially available standard polystyrene (formed by the peak molecular weight of standard polystyrene).

The molecular weight distribution of the unmodified block copolymer can also be determined by GPC measurement in the same manner. The molecular weight distribution is a ratio between the weight average molecular weight (Mw) and the number average molecular weight (Mn).

The molecular weight distribution of a single peak of the modified block copolymer of the present embodiment to be measured by gel permeation chromatography (hereinafter also referred to as "GPC") is preferably 5.0 or less, more preferably 4.0 or less, further preferably 3.0 or less, further more preferably 2.5 or less.

In the modified block copolymer of the present embodiment, the "atomic group having NHx (x=0 to 2) (C)" is an atomic group other than monomer units constituting the main chain of the modified block copolymer, referring to an atomic group having at least one NHx (x=0 to 2).

The atomic group may have a functional group in addition to the at least one NHx (x=0 to 2), and may contain, for example, an amine and a carbonyl group, which may form a cycle to form an imide group.

The "imide group" herein includes cyclic atomic groups and acyclic atomic groups, and also includes those having an unsaturated bond such as maleimide and those having no unsaturated bond such as succinimide.

The atomic group having NHx (x=0 to 2) (C) may be contained in the modified block copolymer in any manner. For example, the atomic group is preferably contained by forming a chemical bond with the polymer block comprising a vinyl aromatic compound as a main constituent (A) and/or the polymer block comprising a conjugate diene compound as a main constituent (B) via an imide group and/or an amide group contained in the atomic group (C).

The atomic group having NHx (x=0 to 2) (C) is intended to be contained in the modified block copolymer side chains from the viewpoint of improvements in mechanical physical properties caused by enhancement in the compatibility with a polar resin and enhancement in the interface strength due to introduction of a plurality of modified groups. The atomic group having NHx (x=0 to 2) (C) is intended to be contained in the modified block copolymer side chains also from the viewpoint of enhancement in the interface strength caused by an anchor effect in the case where the modified block copolymer of the present embodiment is used as the compatibilizer of a resin composition.

When NHx (x=0 to 2) reacts with a polar portion such as a urethane bond in the TPU, a copolymer produced by the reaction serves as the compatibilizer for the TPU and modified block copolymer and the compatibilizer for the TPU and polyolefin to thereby enhance the compatibility for the resin composition. Alternatively, intermolecular interaction such as hydrogen bonds is exerted between NHx (x=0 to 2) and a polar portion such as a urethane bond in the TPU to thereby enhance the compatibility between the TPU and the modified block copolymer and the compatibility between the TPU and the polyolefin.

Examples of the atomic group having NHx (x=0 to 2) (C) include the following structures.

When x=2, the structure is $X^2$—R1-NH$_2$.
When x=1, the structure is $X^2$—R1-NH—R2.
When x=0, the structure is $X^2$—R1-NR3R4.

In a preferred aspect, R1 is a C2-C22 substituted or unsubstituted, saturated or unsaturated hydrocarbon group, R2 is a C2-C13 substituted or unsubstituted, saturated or unsaturated hydrocarbon group, and $X^2$ has a structure in which a carbon-carbon unsaturated bond forms a chemical bond with the polymer block (A) and/or the polymer block (B) via graft modification. $X^2$ has more preferably a structure in which a vinyl or α,β-unsaturated carboxylic acid derivative forms a chemical bond with the polymer block (A) and/or the polymer block (B) via graft modification.

Examples of $X^2$ constituting the atomic group (C) include structures obtained by imidizing, amidating, or esterifying an α,β-unsaturated carboxylic acid, and specific examples include structures in which a N-substituted maleimide, maleic acid amide, maleate, acrylic acid amide, acrylate, methacrylic acid amide, methacrylate, endo-cis-bicyclo[2,2,1]-5-hepten-2,3-dicarboxylic acid amide, or endo-cis-bicyclo[2,2,1]-5-hepten-2,3-dicarboxylate forms a chemical bond with the polymer block (A) and/or the polymer block (B) via graft modification.

$X^2$ is preferably an imide structure or amide structure from the viewpoint of the compatibility with a polar resin, is bonded to the polymer block (A) and/or the polymer block (B) via an imide group and/or an amide group contained in the atomic group (C), and more preferably has a structure in which a N-substituted maleimide or maleic acid amide forms a chemical bond with the polymer block (A) and/or the polymer block (B) via graft modification.

Particularly, in the case of a modification reaction by melt-kneading by means of an extruder, R1, which constitutes the atomic group (C), is preferably shorter, from the viewpoint of the compatibility with polymer chains. In the case of forming a TPU resin composition, R1 is preferably shorter, from the viewpoint of the compatibility with a urethane having a polar site. R1 is preferably a C2-C22 hydrocarbon group, more preferably a C2-C12 alkylene group such as ethylene, propylene, and butylene or a C6-C10 aromatic group such as a phenylene. R1 may additionally contain a hetero atom. R1 is further preferably a C2-C5 alkylene group.

In the case where modification reaction is performed under melt-kneading by means of an extruder, R2, which constitutes the atomic group (C), is preferably shorter, from the viewpoint of the compatibility with polymer chains. In the case of forming a urethane composition, R2 is preferably shorter, from the viewpoint of the compatibility with urethane having a polar site. Meanwhile, from the viewpoint of inhibition of a reaction with a urethane due to steric hindrance, R2 is preferably a C2 or higher hydrocarbon group. R2 is preferably a C2-C13 hydrocarbon group, more preferably a C2-C6 alkyl group such as ethyl, propyl, and isopropyl, and examples thereof include n-butyl, sec-butyl, tert-butyl, isobutyl, pentyl, and structural isomers thereof, hexyl and structural isomers thereof. Alternatively, R2 is preferably a C6-C12 cycloalkyl, for example, cyclohexyl. Alternatively, R2 is preferably a C6-C13 aromatic group, and examples include phenyl and benzyl. Further preferably, $R_2$ is cyclohexyl or benzyl. R2 may additionally contain a hetero atom.

In the atomic group (C), R1 and R2 may be bonded to each other to form a cyclic structure, which is preferably a N-alkylpiperazine structure. A known literature describes inhibition of nucleophilic substitution reactivity due to steric hindrance by substituting a methyl group (C1) as a substituent of a secondary amine by an ethyl group (C2) (J. Org. Chem. Vol. 60 1995, p. 632). The present inventors have found that this inhibition of nucleophilic substitution reactivity due to steric hindrance contributes to strength retention in a TPU resin composition. That is, in the case where the substituent of the secondary amine is a C1 hydrocarbon group, the compatibility between the modified block copolymer and the urethane is high. However, a urethane bond is cut possibly due to a reaction with the substituent, and it is seen that the strength of the urethane tends to be lowered. In contrast, when a C2 or higher hydrocarbon group is used as the substituent of the secondary amine, the reactivity to the urethane is lowered, and the strength of the TPU resin composition tends to be retained. Accordingly, in the case of a TPU resin composition from which strength is required, setting a C2 or higher hydrocarbon group as the substituent of the secondary amine in the modified block copolymer is a preferred aspect.

Particularly in the case of a modification reaction under melt-kneading by means of an extruder, R3 and R4, which constitute the atomic group (C), are preferably shorter, from the viewpoint of the compatibility with polymer chains. Alternatively, in the case of forming a TPU resin composition, R3 and R4 are preferably shorter, from the viewpoint of the compatibility with a urethane having a polar site.

R3 and R4 may be the same or different. These each are preferably a C1-C13 hydrocarbon group, more preferably a C1-C6 alkyl group such as methyl, ethyl, propyl, isopropyl, n-butyl, sec-butyl, tert-butyl, isobutyl, pentyl and a structural isomer thereof, or hexyl and a structural isomer thereof. Alternatively, R3 and R4 each are preferably a C6-C12 cycloalkyl, for example, cyclohexyl. Further, R3 and R4 each are preferably a C6-C13 aromatic group, for example, phenyl or benzyl. Further, more preferably, R3 and R4 each are a cyclohexyl or benzyl.

R3 and R4 each may further contain a hetero atom.

R3 and R4 may be contained in the same cyclic structure, and —NR3R4 is, for example, piperidinyl or pyridinyl.

NHx of the atomic group (C) having NHx (x=0 to 2) is preferably a secondary amino group or amide group wherein x=1. Particularly in the case where the modified group is an imidated, amidated, or esterified $\alpha,\beta$-unsaturated carboxylic acid, if the reaction rate constant of NHx (x=0 to 2) to the $\alpha,\beta$-unsaturated carboxylic acid is smaller than that of the functional group which is not the $\alpha,\beta$-unsaturated carboxylic acid participating in the imidation, amidation, or esterification, NHx (x=0 to 2) becomes the modified group as it is. Thus, NHx is more preferably a secondary amino group having a reaction rate constant lower than that of —$NH_2$/—NH—$CH_3$.

"The reaction rate constant is lower than that of —$NH_2$/—NH—$CH_3$" means that the second order reaction rate constant k of R1-NH—R2 to an electrophilic reactive compound is lower than that of R1-$NH_2$/R1-NH—$CH_3$.

A method for measuring the second order reaction rate constant k is not particularly limited. An example of the method is a method in which phenyl glycidyl ether is used as an electrophilic reactivity compound, described in Toshio Kakurai et al., Journal of Synthetic Organic Chemistry, Japan, vol. 18, No. 7, 485 (1960), wherein k is calculated by the following expressions.

$$k=\log((a-x)b/(b-x)a)/(0.4343(a-b)t)$$

k: second order reaction rate constant (L/mol/min)
a: initial concentration of phenyl glycidyl ether (mol/L)
b: initial concentration of $R_1$—NH—$R_2$ (mol/L)
x: a decrease in the phenyl glycidyl ether concentration or $R_1$—NH—$R_2$ concentration after t minutes (mol/L)
t: reaction time (min)

The amino group having a "reaction rate constant lower than that of R1-$NH_2$/R1-NH—$CH_3$" is not limited to the following. Examples of R2 in R1-NH—R2 include linear ethyl, propyl, butyl, pentyl, hexyl, heptyl, octyl, nonyl, decyl, undecyl, dodecyl and a structural isomer thereof, or cyclohexyl, phenyl, benzyl, or, in the case where R1 and R2 form the same cyclic structure, pyridinyl and piperazinyl. Examples of the amide group of NHx (x=1) include, but are not limited to, amide groups in which the functional group that has substituted the carbonyl group is methyl, ethyl, propyl, butyl, pentyl, hexyl, heptyl, octyl, nonyl, decyl, undecyl, dodecyl, and a structural isomer thereof, or cyclohexyl, phenyl, benzyl, or, in the case where R1 and R2 form the same cyclic structure, piperidone and caprolactam.

In the modified block copolymer of the present embodiment, the atomic group having NHx (x=0 to 2) (C) is introduced to a side chain of the polymer block comprising a vinyl aromatic compound as a main constituent (A) and/or the polymer block comprising a conjugate diene compound as a main constituent (B).

Examples of a method for introducing the atomic group (C) to a side chain of the polymer block (A) and/or the polymer block (B) include a production method of directly grafting a precursor having an unsaturated group contributing to the graft reaction of the atomic group having NHx (x=0 to 2) (C), and a production method in which an $\alpha,\beta$-unsaturated carboxylic acid or a derivative thereof is introduced to a side chain of the polymer block comprising a vinyl aromatic compound as a main constituent (A) and/or the polymer block comprising a conjugate diene compound as a main constituent (B) via a graft reaction, and a compound having NHx (x=0 to 2) is reacted with the $\alpha,\beta$-unsaturated carboxylic acid or a derivative thereof.

In the case of the production method in which a precursor having an unsaturated group contributing to the graft reaction of the atomic group having NHx (x=0 to 2) (C) is directly grafted to introduce the atomic group having NHx (x=0 to 2) (C) to a side chain of the polymer block comprising a vinyl aromatic compound as a main constituent (A) and/or the polymer block comprising a conjugate diene compound as a main constituent (B), an example of the method is a production method in which a precursor having an unsaturated group contributing to the graft reaction of the atomic group having NHx (x=0 to 2) (C) is radically added to a block copolymer containing the polymer block comprising a vinyl aromatic compound as a main constituent (A) and polymer block comprising a conjugate diene compound as a main constituent (B) in the presence of a radical initiator.

In the case of the production method in which an $\alpha,\beta$-unsaturated carboxylic acid or a derivative thereof is introduced to a side chain of the polymer block comprising a vinyl aromatic compound as a main constituent (A) and/or the polymer block comprising a conjugate diene compound as a main constituent (B) via a graft reaction, and a compound having NHx (x=0 to 2) is reacted with the $\alpha,\beta$-unsaturated carboxylic acid or a derivative thereof, examples of the $\alpha,\beta$-unsaturated carboxylic acid or a derivative thereof include, but are not limited to, maleic acid, halogenated maleic acid, itaconic acid, cis-4-cyclohexen-1, 2-dicarboxylic acid, endo-cis-bicyclo[2,2,1]-5-hepten-2,3-dicarboxylic acid and anhydrides of these dicarboxylic acids, and acrylic acid, methacrylic acid, crotonic acid, and monocarboxylates thereof such as methyl methacrylate and glycidyl methacrylate. Anhydrides are preferred, and of these, maleic anhydride is preferred from the viewpoint of reactivity.

The compound having NHx (x=0 to 2) preferably has at least one functional group that reacts with the $\alpha,\beta$-unsaturated carboxylic acid or a derivative thereof, in addition to NHx (x=0 to 2). This functional group is a primary amino group, secondary amino group, or hydroxyl group, which is a typically nucleophilic functional group. When the nucleophilic reactivity of these functional groups to a carbonyl group is equivalent or higher than that of NHx (x=0 to 2), the functional group reacts with the $\alpha,\beta$-unsaturated carboxylic acid or a derivative thereof to form an imide, amide, or ester, and thus, NHx (x=0 to 2) can be introduced to the block copolymer. For this reason, the functional group preferably has nucleophilic reactivity to a carbonyl group equivalent or higher than that of NHx (x=0 to 2). When the functional group is an amino group, a factor that determines the nucleophilic reactivity of the amino group and NHx (x=0 to 2) to a carbonyl group is the steric hindrance of the amino group and NHx (x=0 to 2). In general, a compound having a bulkier substituent is less likely to be subjected to nucleophilic addition.

As a compound having NHx (x=0 to 2), all the compounds exemplified below exert an effect based on this principle.

Examples thereof include ethane-1,2-diamine, propane-1, 3-diamine, butane-1,4-diamine, pentane-1,5-diamine, hexane-1,6-diamine, heptane-1,7-diamine, octane-1,8-diamine, nonane-1,9-diamine, decane-1,10-diamine, undecane-1,11-diamine, dodecane-1,12-diamine, benzene-1,4-diamine, benzene-1,3-diamine, benzene-1,2-diamine, cyclohexane-1,4-diamine, cyclohexane-1,3-diamine, cyclohexane-1,2-diamine, 1,4-phenylenedimethanamine, 1,3-phenylenedimethanamine, and 1,2-phenylenedimethanamine.

Examples thereof also include N-methylethane-1,2-diamine, N-methylpropane-1,3-diamine, N-methylbutane-1,4-diamine, N-methylpentane-1,5-diamine, N-methylhexane-1,6-diamine, N-methylheptane-1,7-diamine, N-methyloctane-1,8-diamine, N-methylnonane-1,9-diamine, N-methyldecane-1,10-diamine, N-methylundecane-1,11-diamine, N-methyldodecane-1,12-diamine, N-methylbenzene-1,4-diamine, N-methylbenzene-1,3-diamine, N-methylbenzene-1,2-diamine, N-methylcyclohexane-1,4-diamine, N-methylcyclohexane-1,3-diamine, N-methylcyclohexane-1,2-diamine, 1-((4-aminomethyl)phenyl)-N-methylmethanamine, 1-((3-aminomethyl)phenyl)-N-methylmethanamine, and 1-((2-aminomethyl)phenyl)-N-methylmethanamine.

Further, examples thereof include N-ethylethane-1,2-diamine, N-ethylpropane-1,3-diamine, N-ethylbutane-1,4-diamine, N-ethylpentane-1,5-diamine, N-ethylhexane-1,6-diamine, N-ethylheptane-1,7-diamine, N-ethyloctane-1,8-diamine, N-ethylnonane-1,9-diamine, N-ethyldecane-1,10-diamine, N-ethylundecane-1,11-diamine, N-ethyldodecane-1,12-diamine, N-ethylbenzene-1,4-diamine, N-ethylbenzene-1,3-diamine, N-ethylbenzene-1,2-diamine, N-ethylcyclohexane-1,4-diamine, N-ethylcyclohexane-1,3-diamine, N-ethylcyclohexane-1,2-diamine, N-((4-aminomethyl)benzyl)ethanamine, N-((3-aminomethyl)benzyl)ethanamine, and N-((2-aminomethyl)benzyl)ethanamine.

Further, examples thereof also include N-propylethane-1,2-diamine, N-propylpropane-1,3-diamine, N-propylbutane-1,4-diamine, N-propylpentane-1,5-diamine, N-propylhexane-1,6-diamine, N-propylheptane-1,7-diamine, N-propyloctane-1,8-diamine, N-propylnonane-1,9-diamine, N-propyldecane-1,10-diamine, N-propylundecane-1,11-diamine, N-propyldodecane-1,12-diamine, N-propylbenzene-1,4-diamine, N-propylbenzene-1,3-diamine, N-propylbenzene-1,2-diamine, N-propylcyclohexane-1,4-diamine, N-propylcyclohexane-1,3-diamine, N-propylcyclohexane-1,2-diamine, N-((4-aminomethyl)benzyl)propan-1-amine, N-((3-aminomethyl)benzyl)propan-1-amine, and N-((2-aminomethyl)benzyl)propan-1-amine.

Additionally, examples thereof further include N-isopropylethane-1,2-diamine, N-isopropylpropane-1,3-diamine, N-isopropylbutane-1,4-diamine, N-isopropylpentane-1,5-diamine, N-isopropylhexane-1,6-diamine, N-isopropylheptane-1,7-diamine, N-isopropyloctane-1,8-diamine, N-isopropylnonane-1,9-diamine, N-isopropyldecane-1,10-diamine, N-isopropylundecane-1,11-diamine, N-isopropyldodecane-1,12-diamine, N-isopropylbenzene-1,4-diamine, N-isopropylbenzene-1,3-diamine, N-isopropylbenzene-1,2-diamine, N-isopropylcyclohexane-1,4-diamine, N-isopropylcyclohexane-1,3-diamine, N-isopropylcyclohexane-1,2-diamine, N-((4-aminomethyl)benzyl)propan-2-amine, N-((3-aminomethyl)benzyl)propan-2-amine, and N-((2-aminomethyl)benzyl) propan-2-amine.

Examples thereof also include N-butylethane-1,2-diamine, N-butylpropane-1,3-diamine, N-butylbutane-1,4-diamine, N-butylpentane-1,5-diamine, N-butylhexane-1,6-diamine, N-butylheptane-1,7-diamine, N-butyloctane-1,8-diamine, N-butylnonane-1,9-diamine, N-butyldecane-1,10-diamine, N-butylundecane-1,11-diamine, N-butyldodecane-1,12-diamine, N-butylbenzene-1,4-diamine, N-butylbenzene-1,3-diamine, N-butylbenzene-1,2-diamine, N-butylcyclohexane-1,4-diamine, N-butylcyclohexane-1,3-diamine, N-butylcyclohexane-1,2-diamine, N-((4-aminomethyl)benzyl)butan-1-amine, N-((3-aminomethyl)benzyl)butan-1-amine, and N-((2-aminomethyl)benzyl)butan-1-amine.

Further, examples thereof include N-(sec-butyl)ethane-1,2-diamine, N-(sec-butyl)propane-1,3-diamine, N-(sec-butyl)butane-1,4-diamine, N-(sec-butyl)pentane-1,5-diamine, N-(sec-butyl)hexane-1,6-diamine, N-(sec-butyl)heptane-1,7-diamine, N-(sec-butyl)octane-1,8-diamine, N-(sec-butyl)nonane-1,9-diamine, N-(sec-butyl)decane-1,10-diamine, N-(sec-butyl)undecane-1,11-diamine, N-(sec-butyl)dodecane-1,12-diamine, N-(sec-butyl)benzene-1,4-diamine, N-(sec-butyl)benzene-1,3-diamine, N-(sec-butyl)benzene-1,2-diamine, N-butyl(sec-butyl)cyclohexane-1,4-diamine, N-(sec-butyl)cyclohexane-1,3-diamine, N-(sec-butyl)cyclohexane-1,2-diamine, N-((4-aminomethyl)benzyl)butan-2-amine, N-((3-aminomethyl)benzyl)butan-2-amine, and N-((2-aminomethyl)benzyl)butan-2-amine.

Further, examples thereof also include N-isobutylethane-1,2-diamine, N-isobutylpropane-1,3-diamine, N-isobutylbutane-1,4-diamine, N-isobutylpentane-1,5-diamine, N-isobutylhexane-1,6-diamine, N-isobutylheptane-1,7-diamine, N-isobutyloctane-1,8-diamine, N-isobutylnonane-1,9-diamine, N-isobutyldecane-1,10-diamine, N-isobutylundecane-1,11-diamine, N-isobutyldodecane-1,12-diamine, N-isobutylbenzene-1,4-diamine, N-isobutylbenzene-1,3-diamine, N-isobutylbenzene-1,2-diamine, N-isobutylcyclohexane-1,4-diamine, N-isobutylcyclohexane-1,3-diamine, N-isobutylcyclohexane-1,2-diamine, N-((4-aminomethyl)benzyl)-2-methylpropan-1-amine, N-((3-aminomethyl)benzyl)-2-methylpropan-1-amine, and N-((2-aminomethyl)benzyl)-2-methylpropan-1-amine.

Additionally, examples thereof further include N-(tert-butyl)ethane-1,2-diamine, N-(tert-butyl)propane-1,3-diamine, N-(tert-butyl)butane-1,4-diamine, N-(tert-butyl)pentane-1,5-diamine, N-(tert-butyl)hexane-1,6-diamine, N-(tert-butyl)heptane-1,7-diamine, N-(tert-butyl)octane-1,8-diamine, N-(tert-butyl)nonane-1,9-diamine, N-(tert-butyl)decane-1,10-diamine, N-(tert-butyl)undecane-1,11-diamine, N-(tert-butyl)dodecane-1,12-diamine, N-(tert-butyl)benzene-1,4-diamine, N-(tert-butyl)benzene-1,3-diamine, N-(tert-butyl)benzene-1,2-diamine, N-(tert-butyl)cyclohexane-1,4-diamine, N-(tert-butyl)cyclohexane-1,3-diamine, N-(tert-butyl)cyclohexane-1,2-diamine, N-((4-aminomethyl)benzyl)-2-methylpropan-2-amine, N-((3-aminomethyl)benzyl)-2-methylpropan-2-amine, and N-((2-aminomethyl)benzyl)-2-methylpropan-2-amine.

Examples thereof also include N-pentylethane-1,2-diamine, N-pentylpropane-1,3-diamine, N-pentylbutane-1,4-diamine, N-pentylpentane-1,5-diamine, N-pentylhexane-1,6-diamine, N-pentylheptane-1,7-diamine, N-pentyloctane-1,8-diamine, N-pentylnonane-1,9-diamine, N-pentyldecane-1,10-diamine, N-pentylundecane-1,11-diamine, N-pentyldodecane-1,12-diamine, N-pentylbenzene-1,4-diamine, N-pentylbenzene-1,3-diamine, N-pentylbenzene-1,2-diamine, N-pentylcyclohexane-1,4-diamine, N-pentylcyclohexane-1,3-diamine, N-pentylcyclohexane-1,2-diamine, N-((4-aminomethyl)benzyl)pentan-1-amine, N-((3-aminomethyl)benzyl)pentan-1-amine, and N-((2-aminomethyl)benzyl)pentan-1-amine.

Further, examples thereof include N-(pentan-2-yl)ethane-1,2-diamine, N-(pentan-2-yl)propane-1,3-diamine, N-(pentan-2-yl)butane-1,4-diamine, N-(pentan-2-yl)pentane-1,5-diamine, N-(pentan-2-yl)hexane-1,6-diamine, N-(pentan-2-yl)heptane-1,7-diamine, N-(pentan-2-yl)octane-1,8- diamine, N-(pentan-2-yl)nonane-1,9-diamine, N-(pentan-2-yl)decane-1,10-diamine, N-(pentan-2-yl)undecane-1,11-diamine, N-(pentan-2-yl)dodecane-1,12-diamine, N-(pentan-2-yl)benzene-1,4-diamine, N-(pentan-2-yl)benzene-1,3-diamine, N-(pentan-2-yl)benzene-1,2-diamine, N-(pentan-2-yl)cyclohexane-1,4-diamine, N-(pentan-2-yl)cyclohexane-1,3-diamine, N-(pentan-2-yl)cyclohexane-1,2-diamine, N-((4-aminomethyl)benzyl)pentan-2-amine, N-((3-aminomethyl)benzyl)pentan-2-amine, and N-((2-aminomethyl)benzyl) pentan-2-amine.

Further, examples thereof also include N-(pentan-3-yl)ethane-1,2-diamine, N-(pentan-3-yl)propane-1,3-diamine, N-(pentan-3-yl)butane-1,4-diamine, N-(pentan-3-yl)pentane-1,5-diamine, N-(pentan-3-yl)hexane-1,6-diamine, N-(pentan-3-yl)heptane-1,7-diamine, N-(pentan-3-yl)octane-1,8-diamine, N-(pentan-3-yl)nonane-1,9-diamine, N-(pentan-3-yl)decane-1,10-diamine, N-(pentan-3-yl)undecane-1,11-diamine, N-(pentan-3-yl)dodecane-1,12-diamine, N-(pentan-3-yl)benzene-1,4-diamine, N-(pentan-3-yl)benzene-1,3-diamine, N-(pentan-3-yl)benzene-1,2-diamine, N-(pentan-3-yl)cyclohexane-1,4-diamine, N-(pentan-3-yl)cyclohexane-1,3-diamine, N-(pentan-3-yl)cyclohexane-1,2-diamine, N-((4-aminomethyl)benzyl)pentane-3-amine, N-((3-aminomethyl)benzyl)pentan-3-amine, and N-((2-aminomethyl)benzyl) pentan-3-amine.

Additionally, examples thereof further include N-isopentylethane-1,2-diamine, N-isopentylpropane-1,3-diamine, N-isopentylbutane-1,4-diamine, N-isopentylpentane-1,5-diamine, N-isopentylhexane-1,6-diamine, N-isopentylheptane-1,7-diamine, N-isopentyloctane-1,8-diamine, N-isopentylnonane-1,9-diamine, N-isopentyldecane-1,10-diamine, N-isopentylundecane-1,11-diamine, N-isopentyldodecane-1,12-diamine, N-isopentylbenzene-1,4-diamine, N-isopentylbenzene-1,3-diamine, N-isopentylbenzene-1,2-diamine, N-isopentylcyclohexane-1,4-diamine, N-isopentylcyclohexane-1,3-diamine, N-isopentylcyclohexane-1,2-diamine, N-((4-aminomethyl)benzyl)-3-methylbutan-1-amine, N-((3-aminomethyl)benzyl)-3-methylbutan-1-amine, and N-((2-aminomethyl)benzyl)-3-methylbutan-1-amine.

Examples thereof also include N-(3-methylbutan-2-yl)ethane-1,2-diamine, N-(3-methylbutan-2-yl)propane-1,3-diamine, N-(3-methylbutan-2-yl)butane-1,4-diamine, N-(3-methylbutan-2-yl)pentane-1,5-diamine, N-(3-methylbutan-2-yl)hexane-1,6-diamine, N-(3-methylbutan-2-yl)heptane-1,7-diamine, N-(3-methylbutan-2-yl)octane-1,8-diamine, N-(3-methylbutan-2-yl)nonane-1,9-diamine, N-(3-methylbutan-2-yl)decane-1,10-diamine, N-(3-methylbutan-2-yl)undecane-1,11-diamine, N-(3-methylbutan-2-yl)dodecane-1,12-diamine, N-(3-methylbutan-2-yl)benzene-1,4-diamine, N-(3-methylbutan-2-yl)benzene-1,3-diamine, N-(3-methylbutan-2-yl)benzene-1,2-diamine, N-(3-methylbutan-2-yl)cyclohexane-1,4-diamine, N-(3-methylbutan-2-yl)cyclohexane-1,3-diamine, N-(3-methylbutan-2-yl)cyclohexane-1,2-diamine, N-((4-aminomethyl)benzyl)-3-methylbutan-2-amine, N-((3-aminomethyl)benzyl)-3-methylbutan-2-amine, and N-((2-aminomethyl)benzyl)-3-methylbutan-2-amine.

Further, examples thereof include N-(tert-pentyl)ethane-1,2-diamine, N-(tert-pentyl)propane-1,3-diamine, N-(tert-pentyl)butane-1,4-diamine, N-(tert-pentyl)pentane-1,5-diamine, N-(tert-pentyl)hexane-1,6-diamine, N-(tert-pentyl)heptane-1,7-diamine, N-(tert-pentyl)octane-1,8-diamine, N-(tert-pentyl)nonane-1,9-diamine, N-(tert-pentyl)decane-1,10-diamine, N-(tert-pentyl)undecane-1,11-diamine, N-(tert-pentyl)dodecane-1,12-diamine, N-(tert-pentyl)benzene-1,4-diamine, N-(tert-pentyl)benzene-1,3-diamine, N-(tert-pentyl)benzene-1,2-diamine, N-(tert-pentyl)cyclohexane-1,4-diamine, N-(tert-pentyl)cyclohexane-1,3-diamine, N-(tert-pentyl)cyclohexane-1,2-diamine, N-((4-aminomethyl)benzyl)-2-methylbutan-2-amine, N-((3-aminomethyl)benzyl)-2-methylbutan-2-amine, and N-((2-aminomethyl)benzyl)-2-methylbutan-2-amine.

Further, examples thereof also include N-(2-methylbutyl)ethane-1,2-diamine, N-(2-methylbutyl)propane-1,3-diamine, N-(2-methylbutyl)butane-1,4-diamine, N-(2-methylbutyl)pentane-1,5-diamine, N-(2-methylbutyl)hexane-1,6-diamine, N-(2-methylbutyl)heptane-1,7-diamine, N-(2-methylbutyl)octane-1,8-diamine, N-(2-methylbutyl)nonane-1,9-diamine, N-(2-methylbutyl)decane-1,10-diamine, N-(2-methylbutyl)undecane-1,11-diamine, N-(2-methylbutyl)dodecane-1,12-diamine, N-(2-methylbutyl)benzene-1,4-diamine, N-(2-methylbutyl)benzene-1,3-diamine, N-(2-methylbutyl)benzene-1,2-diamine, N-(2-methylbutyl)cyclohexane-1,4-diamine, N-(2-methylbutyl)cyclohexane-1,3-diamine, N-(2-methylbutyl)cyclohexane-1,2-diamine, N-((4-aminomethyl)benzyl)-2-methylbutan-1-amine, N-((3-aminomethyl)benzyl)-2-methylbutan-1-amine, and N-((2-aminomethyl)benzyl)-2-methylbutan-1-amine.

Additionally, examples thereof further include N-neopentylethane-1,2-diamine, N-neopentylpropane-1,3-diamine, N-neopentylbutane-1,4-diamine, N-neopentylpentane-1,5-diamine, N-neopentylhexane-1,6-diamine, N-neopentylheptane-1,7-diamine, N-neopentyloctane-1,8-diamine, N-neopentylnonane-1,9-diamine, N-neopentyldecane-1,10-diamine, N-neopentylundecane-1,11-diamine, N-neopentyldodecane-1,12-diamine, N-neopentylbenzene-1,4-diamine, N-neopentylbenzene-1,3-diamine, N-neopentylbenzene-1,2-diamine, N-neopentylcyclohexane-1,4-diamine, N-neopentylcyclohexane-1,3-diamine, N-neopentylcyclohexane-1,2-diamine, N-((4-aminomethyl)benzyl)-2,2-dimethylpropan-1-amine, N-((3-aminomethyl)benzyl)-2,2-dimethylpropan-1-amine, and N-((2-aminomethyl)benzyl)-2,2-dimethylpropan-1-amine.

Examples thereof also include N-hexylethane-1,2-diamine, N-hexylpropane-1,3-diamine, N-hexylbutane-1,4-diamine, N-hexylpentane-1,5-diamine, N-hexylhexane-1,6-diamine, N-hexylheptane-1,7-diamine, N-hexyloctane-1,8-diamine, N-hexylnonane-1,9-diamine, N-hexyldecane-1,10-diamine, N-hexylundecane-1,11-diamine, N-hexyldodecane-1,12-diamine, N-hexylbenzene-1,4-diamine, N-hexylbenzene-1,3-diamine, N-hexylbenzene-1,2-diamine, N-hexylcyclohexane-1,4-diamine, N-hexylcyclohexane-1,3-diamine, N-hexylcyclohexane-1,2-diamine, N-((4-aminomethyl)benzyl)hexan-1-amine, N-((3-aminomethyl)benzyl)hexan-1-amine, and N-((2-aminomethyl)benzyl)hexan-1-amine.

Further, examples thereof include N-(hexan-2-yl)ethane-1,2-diamine, N-(hexan-2-yl)propane-1,3-diamine, N-(hexan-2-yl)butane-1,4-diamine, N-(hexan-2-yl)pentane-1,5-diamine, N-(hexan-2-yl)hexane-1,6-diamine, N-(hexan-2-yl)heptane-1,7-diamine, N-(hexan-2-yl)octane-1,8-diamine, N-(hexan-2-yl)nonane-1,9-diamine, N-(hexan-2-yl)decane-1,10-diamine, N-(hexan-2-yl)undecane-1,11-diamine, N-(hexan-2-yl)dodecane-1,12-diamine, N-(hexan-2-yl)benzene-1,4-diamine, N-(hexan-2-yl)benzene-1,3-diamine, N-(hexan-2-yl)benzene-1,2-diamine, N-(hexan-2-yl)cyclohexane-1,4-diamine, N-(hexan-2-yl)cyclohexane-1,3-diamine, N-(hexan-2-yl)cyclohexane-1,2-diamine, N-((4-aminomethyl)benzyl)hexan-2-amine, N-((3-aminomethyl)benzyl)hexan-2-amine, and N-((2-aminomethyl)benzyl) hexan-2-amine.

Further, examples thereof also include N-(hexan-3-yl)ethane-1,2-diamine, N-(hexan-3-yl)propane-1,3-diamine, N-(hexan-3-yl)butane-1,4-diamine, N-(hexan-3-yl)pentane-1,5-diamine, N-(hexan-3-yl)hexane-1,6-diamine, N-(hexan-3-yl)heptane-1,7-diamine, N-(hexan-3-yl)octane-1,8-diamine, N-(hexan-3-yl)nonane-1,9-diamine, N-(hexan-3-yl)decane-1,10-diamine, N-(hexan-3-yl)undecane-1,11-diamine, N-(hexan-3-yl)dodecane-1,12-diamine, N-(hexan-3-yl)benzene-1,4-diamine, N-(hexan-3-yl)benzene-1,3-diamine, N-(hexan-3-yl)benzene-1,2-diamine, N-(hexan-3-yl)cyclohexane-1,4-diamine, N-(hexan-3-yl)cyclohexane-1,3-diamine, N-(hexan-3-yl)cyclohexane-1,2-diamine, N-((4-aminomethyl)benzyl)hexan-3-amine, N-((3-aminomethyl)benzyl)hexan-3-amine, and N-((2-aminomethyl)benzyl)hexan-3-amine.

Additionally, examples thereof further include N-(4-methylpentyl)ethane-1,2-diamine, N-(4-methylpentyl)propane-1,3-diamine, N-(4-methylpentyl)butane-1,4-diamine, N-(4-methylpentyl)pentane-1,5-diamine, N-(4-methylpentyl)hexane-1,6-diamine, N-(4-methylpentyl)heptane-1,7-diamine, N-(4-methylpentyl)octane-1,8-diamine, N-(4-methylpentyl)nonane-1,9-diamine, N-(4-methylpentyl)decane-1,10-diamine, N-(4-methylpentyl)undecane-1,11-diamine, N-(4-methylpentyl)dodecane-1,12-diamine, N-(4-methylpentyl)benzene-1,4-diamine, N-(4-methylpentyl)benzene-1,3-diamine, N-((4-methylpentyl)benzene-1,2-diamine, N-(4-methylpentyl)cyclohexane-1,4-diamine, N-(4-methylpentyl)cyclohexane-1,3-diamine, N-(4-methylpentyl)cyclohexane-1,2-diamine, N-((4-aminomethyl)benzyl)-4-methylpentan-1-amine, N-((3-aminomethyl)benzyl)-4-methylpentan-1-amine, and N-((2-aminomethyl)benzyl)-4-methylpentan-1-amine.

Examples thereof also include N-(4-methylpentan-2-yl)ethane-1,2-diamine, N-(4-methylpentan-2-yl)propane-1,3-diamine, N-(4-methylpentan-2-yl)butane-1,4-diamine, N-(4-methylpentan-2-yl)pentane-1,5-diamine, N-(4-methylpentan-2-yl)hexane-1,6-diamine, N-(4-methylpentan-2-yl)heptane-1,7-diamine, N-(4-methylpentan-2-yl)octane-1,8-diamine, N-(4-methylpentan-2-yl)nonane-1,9-diamine, N-(4-methylpentan-2-yl)decane-1,10-diamine, N-(4-methylpentan-2-yl)undecane-1,11-diamine, N-(4-methylpentan-2-yl)dodecane-1,12-diamine, N-(4-methylpentan-2-yl)benzene-1,4-diamine, N-(4-methylpentan-2-yl)benzene-1,3-diamine, N-(4-methylpentan-2-yl)benzene-1,2-diamine, N-(4-methylpentan-2-yl)cyclohexane-1,4-diamine, N-(4-methylpentan-2-yl)cyclohexane-1,3-diamine, N-(4-methylpentan-2-yl)cyclohexane-1,2-diamine, N-((4-aminomethyl)benzyl)-4-methylpentan-2-amine, N-((3-aminomethyl)benzyl)-4-methylpentan-2-amine, and N-((2-aminomethyl)benzyl)-4-methylpentan-2-amine.

Further, examples thereof include N-(2-methylpentan-3-yl)ethane-1,2-diamine, N-(2-methylpentan-3-yl)propane-1,3-diamine, N-(2-methylpentan-3-yl)butane-1,4-diamine, N-(2-methylpentan-3-yl)pentane-1,5-diamine, N-(2-methylpentan-3-yl) hexane-1,6-diamine, N-(2-methylpentan-3-yl)heptane-1,7-diamine, N-(2-methylpentan-3-yl)octane-1,8-diamine, N-(2-methylpentan-3-yl)nonane-1,9-diamine, N-(2-methylpentan-3-yl)decane-1,10-diamine, N-(2-methylpentan-3-yl)undecane-1,11-diamine, N-(2-methylpentan-3-yl)dodecane-1,12-diamine, N-(2-methylpentan-3-yl)benzene-1,4-diamine, N-(2-methylpentan-3-yl)benzene-1,3-diamine, N-(2-methylpentan-3-yl)benzene-1,2-diamine, N-(2-methylpentan-3-yl)cyclohexane-1,4-diamine, N-(2-methylpentan-3-yl)cyclohexane-1,3-diamine, N-(2-methylpentan-3-yl)cyclohexane-1,2-diamine, N-((4-aminomethyl)benzyl)-2-methylpentan-3-amine, N-((3-aminomethyl)benzyl)-2-methylpentan-3-amine, and N-((2-aminomethyl)benzyl)-2-methylpentan-3-amine.

Further, examples thereof also include N-(2-methylpentan-2-yl)ethane-1,2-diamine, N-(2-methylpentan-2-yl)propane-1,3-diamine, N-(2-methylpentan-2-yl)butane-1,4-diamine, N-(2-methylpentan-2-yl)pentane-1,5-diamine, N-(2-methylpentan-2-yl)hexane-1,6-diamine, N-(2-methylpentan-2-yl)heptane-1,7-diamine, N-(2-methylpentan-2-yl)octane-1,8-diamine, N-(2-methylpentan-2-yl)nonane-1,9-diamine, N-(2-methylpentan-2-yl)decane-1,10-diamine, N-(2-methylpentan-2-yl)undecane-1,11-diamine, N-(2-methylpentan-2-yl)dodecane-1,12-diamine, N-(2-methylpentan-2-yl)benzene-1,4-diamine, N-(2-methylpentan-2-yl)benzene-1,3-diamine, N-(2-methylpentan-2-yl)benzene-1,2-diamine, N-(2-methylpentan-2-yl)cyclohexane-1,4-diamine, N-(2-methylpentan-2-yl)cyclohexane-1,3-diamine, N-(2-methylpentan-2-yl)cyclohexane-1,2-diamine, N-((4-aminomethyl)benzyl)-2-methylpentan-2-amine, N-((3-aminomethyl)benzyl)-2-methylpentan-2-amine, and N-((2-aminomethyl)benzyl)-2-methylpentan-2-amine.

Additionally, examples thereof further include N-(2-methylpentan-2-yl)ethane-1,2-diamine, N-(2-methylpentan-2-yl)propane-1,3-diamine, N-(2-methylpentan-2-yl)butane-1,4-diamine, N-(2-methylpentan-2-yl)pentane-1,5-diamine, N-(2-methylpentan-2-yl)hexane-1,6-diamine, N-(2-methylpentan-2-yl)heptane-1,7-diamine, N-(2-methylpentan-2-yl)octane-1,8-diamine, N-(2-methylpentan-2-yl)nonane-1,9-diamine, N-(2-methylpentan-2-yl)decane-1,10-diamine, N-(2-methylpentan-2-yl)undecane-1,11-diamine, N-(2-methylpentan-2-yl)dodecane-1,12-diamine, N-(2-methylpentan-2-yl)benzene-1,4-diamine, N-(2-methylpentan-2-yl)benzene-1,3-diamine, N-(2-methylpentan-2-yl)benzene-1,2-diamine, N-(2-methylpentan-2-yl)cyclohexane-1,4-diamine, N-(2-methylpentan-2-yl)cyclohexane-1,3-diamine, N-(2-methylpentan-2-yl)cyclohexane-1,2-diamine, N-((4-aminomethyl)benzyl)-2-methylpentan-2-amine, N-((3-aminomethyl)benzyl)-2-methylpentan-2-amine, and N-((2-aminomethyl)benzyl)-2-methylpentan-2-amine.

Further, examples thereof also include N-(2-methylpentyl)ethane-1,2-diamine, N-(2-methylpentyl)propane-1,3-diamine, N-(2-methylpentyl)butane-1,4-diamine, N-(2-methylpentyl)pentane-1,5-diamine, N-(2-methylpentyl)hexane-1,6-diamine, N-(2-methylpentyl)heptane-1,7-diamine, N-(2-methylpentyl)octane-1,8-diamine, N-(2-methylpentyl)nonane-1,9-diamine, N-(2-methylpentyl)decane-1,10-diamine, N-(2-methylpentyl)undecane-1,11-diamine, N-(2-methylpentyl)dodecane-1,12-diamine, N-(2-methylpentyl)benzene-1,4-diamine, N-(2-methylpentyl)benzene-1,3-diamine, N-(2-methylpentyl)benzene-1,2-diamine, N-(2-methylpentyl)cyclohexane-1,4-diamine, N-(2-methylpentyl)cyclohexane-1,3-diamine, N-(2-methylpentyl)cyclohexane-1,2-diamine, N-((4-aminomethyl)benzyl)-2-methylpentan-1-amine, N-((3-aminomethyl)benzyl)-2-methylpentan-1-amine, and N-((2-aminomethyl)benzyl)-2-methylpentan-1-amine.

Additionally, examples thereof further include N-(3-methylpentyl)ethane-1,2-diamine, N-(3-methylpentyl)propane-1,3-diamine, N-(3-methylpentyl)butane-1,4-diamine, N-(3-methylpentyl)pentane-1,5-diamine, N-(3-methylpentyl)hexane-1,6-diamine, N-(3-methylpentyl)heptane-1,7-diamine, N-(3-methylpentyl)octane-1,8-diamine, N-(3-methylpentyl)nonane-1,9-diamine, N-(3-methylpentyl)decane-1,10-diamine, N-(3-methylpentyl)undecane-1,11-diamine, N-(3-methylpentyl)dodecane-1,12-diamine, N-(3-methylpentyl)benzene-1,4-diamine, N-(3-methylpentyl)benzene-1,3-diamine, N-(3-methylpentyl)benzene-1,2-diamine, N-(3-methylpentyl)cyclohexane-1,4-diamine, N-(3-methylpentyl)cyclohexane-1,3-diamine, N-(3- methylpentyl)cyclohexane-1,2-diamine, N-((4-aminomethyl)benzyl)-3-methylpentan-1-amine, N-((3-aminomethyl)benzyl)-3-methylpentan-1-amine, and N-((2-aminomethyl)benzyl)-3-methylpentan-1-amine.

Examples thereof also include N-(3-methylpentan-2-yl)ethane-1,2-diamine, N-(3-methylpentan-2-yl)propane-1,3-diamine, N-(3-methylpentan-2-yl)butane-1,4-diamine, N-(3-methylpentan-2-yl)pentane-1,5-diamine, N-(3-methylpentan-2-yl) hexane-1,6-diamine, N-(3-methylpentan-2-yl)heptane-1,7-diamine, N-(3-methylpentan-2-yl)octane-1,8-diamine, N-(3-methylpentan-2-yl)nonane-1,9-diamine, N-(3-methylpentan-2-yl)decane-1,10-diamine, N-(3-methylpentan-2-yl)undecane-1,11-diamine, N-(3-methylpentan-2-yl)dodecane-1,12-diamine, N-(3-methylpentan-2-yl)benzene-1,4-diamine, N-(3-methylpentan-2-yl)benzene-1,3-diamine, N-(3-methylpentan-2-yl)benzene-1,2-diamine, N-(3-methylpentan-2-yl)cyclohexane-1,4-diamine, N-(3-methylpentan-2-yl)cyclohexane-1,3-diamine, N-(3(3-methylpentan-2-yl)cyclohexane-1,2-diamine, N-((4-aminomethyl)benzyl)-3-methylpentan-2-amine, N-((3-aminomethyl)benzyl)-3-methylpentan-2-amine, and N-((2-aminomethyl)benzyl)-3-methylpentan-2-amine.

Further, examples thereof include N-(3-methylpentan-3-yl)ethane-1,2-diamine, N-(3-methylpentan-3-yl)propane-1,3-diamine, N-(3-methylpentan-3-yl)butane-1,4-diamine, N-(3-methylpentan-3-yl)pentane-1,5-diamine, N-(3-methylpentan-3-yl)hexane-1,6-diamine, N-(3-methylpentan-3-yl)heptane-1,7-diamine, N-(3-methylpentan-3-yl)octane-1,8-diamine, N-(3-methylpentan-3-yl)nonane-1,9-diamine, N-(3-methylpentan-3-yl)decane-1,10-diamine, N-(3-methylpentan-3-yl)undecane-1,11-diamine, N-(3-methylpentan-3-yl)dodecane-1,12-diamine, N-(3-methylpentan-3-yl)benzene-1,4-diamine, N-(3-methylpentan-3-yl)benzene-1,3-diamine, N-(3-methylpentan-3-yl)benzene-1,2-diamine, N-(3-methylpentan-3-yl)cyclohexane-1,4-diamine, N-(3-methylpentan-3-yl)cyclohexane-1,3-diamine, N-(3(3-methylpentan-3-yl)cyclohexane-1,2-diamine, N-((4-aminomethyl)benzyl)-3-methylpentan-3-amine, N-((3-aminomethyl)benzyl)-3-methylpentan-3-amine, and N-((2-aminomethyl)benzyl)-3-methylpentan-3-amine.

Further, examples thereof also include N-(2-ethylbutyl)ethane-1,2-diamine, N-(2-ethylbutyl)propane-1,3-diamine, N-(2-ethylbutyl)butane-1,4-diamine, N-(2-ethylbutyl)pentane-1,5-diamine, N-(2-ethylbutyl)hexane-1,6-diamine, N-(2-ethylbutyl)heptane-1,7-diamine, N-((2-ethylbutyl)octane-1,8-diamine, N-(2-ethylbutyl)nonane-1,9-diamine, N-(2-ethylbutyl)decane-1,10-diamine, N-(2-ethylbutyl)undecane-1,11-diamine, N-(2-ethylbutyl)dodecane-1,12-diamine, N-(2-ethylbutyl)benzene-1,4-diamine, N-(2-ethylbutyl)benzene-1,3-diamine, N-(2-ethylbutyl)benzene-1,2-diamine, N-(2-ethylbutyl)cyclohexane-1,4-diamine, N-(2-ethylbutyl)cyclohexane-1,3-diamine, N-(2-ethylbutyl)cyclohexane-1,2-diamine, N-((4-aminomethyl)benzyl)-2-ethylbutan-1-amine, N-((3-aminomethyl)benzyl)-2-ethylbutan-1-amine, and N-((2-aminomethyl)benzyl)-2-ethylbutan-1-amine.

Additionally, examples thereof further include N-(2,3-dimethylbutyl)ethane-1,2-diamine, N-(2,3-dimethylbutyl)propane-1,3-diamine, N-(2,3-dimethylbutyl)butane-1,4-diamine, N-(2,3-dimethylbutyl)pentane-1,5-diamine, N-(2,3-dimethylbutyl)hexane-1,6-diamine, N-(2,3-dimethylbutyl)heptane-1,7-diamine, N-(2,3-dimethylbutyl)octane-1,8-diamine, N-(2,3-dimethylbutyl)nonane-1,9-diamine, N-(2,3-dimethylbutyl)decane-1,10-diamine, N-(2,3-dimethylbutyl)undecane-1,11-diamine, N-(2-ethylbutyl) (2,3-dimethylbutyl)dodecane-1,12-diamine, N-(2,3-dimethylbutyl)benzene-1,4-diamine, N-(2,3-dimethylbutyl)benzene-1,3-diamine, N-(2,3-dimethylbutyl)benzene-1,2-diamine, N-(2,3-dimethylbutyl)cyclohexane-1,4-diamine, N-(2,3-dimethylbutyl)cyclohexane-1,3-diamine, N-(2,3-dimethylbutyl)cyclohexane-1,2-diamine, N-((4-aminomethyl)benzyl)-2,3-dimethylbutan-1-amine, N-((3-aminomethyl)benzyl)-2,3-dimethylbutan-1-amine, and N-((2-aminomethyl)benzyl)-2,3-dimethylbutan-1-amine.

Examples thereof also include N-(2,3-dimethylbutan-2-yl)ethane-1,2-diamine, N-(2,3-dimethylbutan-2-yl)propane-1,3-diamine, N-(2,3-dimethylbutan-2-yl)butane-1,4-diamine, N-(2,3-dimethylbutan-2-yl)pentane-1,5-diamine, N-(2,3-dimethylbutan-2-yl)hexane-1,6-diamine, N-(2,3-dimethylbutan-2-yl)heptane-1,7-diamine, N-(2,3-dimethylbutan-2-yl)octane-1,8-diamine, N-(2,3-dimethylbutan-2-yl)nonane-1,9-diamine, N-(2,3-dimethylbutan-2-yl)decane-1,10-diamine, N-(2,3-dimethylbutan-2-yl)undecane-1,11-diamine, N-(2-ethylbutyl) (2,3-dimethylbutan-2-yl)dodecane-1,12-diamine, N-(2,3-dimethylbutan-2-yl)benzene-1,4-diamine, N-(2,3-dimethylbutan-2-yl)benzene-1,3-diamine, N-(2,3-dimethylbutan-2-yl)benzene-1,2-diamine, N-(2,3-dimethylbutan-2-yl)cyclohexane-1,4-diamine, N-(2,3-dimethylbutan-2-yl)cyclohexane-1,3-diamine, N-(2,3-dimethylbutan-2-yl)cyclohexane-1,2-diamine, N-((4-aminomethyl)benzyl)-2,3-dimethylbutan-2-amine, N-((3-aminomethyl)benzyl)-2,3-dimethylbutan-2-amine, and N-((2-aminomethyl)benzyl)-2,3-dimethylbutan-2-amine.

Further, examples thereof include N-(2,2-dimethylbutyl)ethane-1,2-diamine, N-(2,2-dimethylbutyl)propane-1,3-diamine, N-(2,2-dimethylbutyl)butane-1,4-diamine, N-(2,2-dimethylbutyl)pentane-1,5-diamine, N-(2,2-dimethylbutyl)hexane-1,6-diamine, N-(2,2-dimethylbutyl)heptane-1,7-diamine, N-(2,2-dimethylbutyl)octane-1,8-diamine, N-(2,2-dimethylbutyl)nonane-1,9-diamine, N-(2,2-dimethylbutyl)decane-1,10-diamine, N-(2,2-dimethylbutyl)undecane-1,11-diamine, N-(2-ethylbutyl) (2,2-dimethylbutyl)dodecane-1,12-diamine, N-(2,2-dimethylbutyl)benzene-1,4-diamine, N-(2,2-dimethylbutyl)benzene-1,3-diamine, N-(2,2-dimethylbutyl)benzene-1,2-diamine, N-(2,2-dimethylbutyl)cyclohexane-1,4-diamine, N-(2,2-dimethylbutyl)cyclohexane-1,3-diamine, N-(2,2-dimethylbutyl)cyclohexane-1,2-diamine, N-((4-aminomethyl)benzyl)-2,2-dimethylbutan-1-amine, N-((3-aminomethyl)benzyl)-2,2-dimethylbutan-1-amine, and N-((2-aminomethyl)benzyl)-2,2-dimethylbutan-1-amine.

Further, examples thereof also include N-(3,3-dimethylbutan-2-yl)ethane-1,2-diamine, N-(3,3-dimethylbutan-2-yl)propane-1,3-diamine, N-(3,3-dimethylbutan-2-yl)butane-1,4-diamine, N-(3,3-dimethylbutan-2-yl)pentane-1,5-diamine, N-(3,3-dimethylbutan-2-yl)hexane-1,6-diamine, N-(3,3-dimethylbutan-2-yl)heptane-1,7-diamine, N-(3,3-dimethylbutan-2-yl)octane-1,8-diamine, N-(3,3-dimethylbutan-2-yl)nonane-1,9-diamine, N-(3,3-dimethylbutan-2-yl)decane-1,10-diamine, N-(3,3-dimethylbutan-2-yl)undecane-1,11-diamine, N-(2-ethylbutyl) (3,3-dimethylbutan-2-yl)dodecane-1,12-diamine, N-(3,3-dimethylbutan-2-yl)benzene-1,4-diamine, N-(3,3-dimethylbutan-2-yl)benzene-1,3-diamine, N-(3,3-dimethylbutan-2-yl)benzene-1,2-diamine, N-(3,3-dimethylbutan-2-yl)cyclohexane-1,4-diamine, N-(3,3-dimethylbutan-2-yl)cyclohexane-1,3-diamine, N-(3,3-dimethylbutan-2-yl)cyclohexane-1,2-diamine, N-((4-aminomethyl)benzyl)-3,3-dimethylbutan-2-amine, N-((3-aminomethyl)benzyl)-3,3-dimethylbutan-2-amine, and N-((2-aminomethyl)benzyl)-3,3-dimethylbutan-2-amine.

Additionally, examples thereof further include N-(3,3-dimethylbutyl)ethane-1,2-diamine, N-(3,3-dimethylbutyl)

propane-1,3-diamine, N-(3,3-dimethylbutyl)butane-1,4-diamine, N-(3,3-dimethylbutyl)pentane-1,5-diamine, N-(3,3-dimethylbutyl)hexane-1,6-diamine, N-(3,3-dimethylbutyl)heptane-1,7-diamine, N-(3,3-dimethylbutyl)octane-1,8-diamine, N-(3,3-dimethylbutyl)nonane-1,9-diamine, N-(3,3-dimethylbutyl)decane-1,10-diamine, N-(3,3-dimethylbutyl)undecane-1,11-diamine, N-(2-ethylbutyl)(3,3-dimethylbutyl)dodecane-1,12-diamine, N-(3,3-dimethylbutyl)benzene-1,4-diamine, N-(3,3-dimethylbutyl)benzene-1,3-diamine, N-(3,3-dimethylbutyl)benzene-1,2-diamine, N-(3,3-dimethylbutyl)cyclohexane-1,4-diamine, N-(3,3-dimethylbutyl)cyclohexane-1,3-diamine, N-(3,3-dimethylbutyl)cyclohexane-1,2-diamine, N-((4-aminomethyl)benzyl)-3,3-dimethylbutan-1-amine, N-((3-aminomethyl)benzyl)-3,3-dimethylbutan-1-amine, and N-((2-aminomethyl)benzyl)-3,3-dimethylbutan-1-amine.

Examples thereof also include N-cyclohexylethane-1,2-diamine, N-cyclohexylpropane-1,3-diamine, N-cyclohexylbutane-1,4-diamine, N-cyclohexylpentane-1,5-diamine, N-cyclohexylhexane-1,6-diamine, N-cyclohexylheptane-1,7-diamine, N-cyclohexyloctane-1,8-diamine, N-cyclohexylnonane-1,9-diamine, N-cyclohexyldecane-1,10-diamine, N-cyclohexylundecane-1,11-diamine, N-cyclohexyldodecane-1,12-diamine, N-cyclohexylbenzene-1,4-diamine, N-cyclohexylbenzene-1,3-diamine, N-cyclohexylbenzene-1,2-diamine, N-cyclohexylcyclohexane-1,4-diamine, N-cyclohexylcyclohexane-1,3-diamine, N-cyclohexylcyclohexane-1,2-diamine, N-((4-aminomethyl)benzyl)cyclohexanamine, N-((3-aminomethyl)benzyl)cyclohexanamine, and N-((2-aminomethyl)benzyl)cyclohexanamine.

Further, examples thereof include N-(cyclohexylmethyl)ethane-1,2-diamine, N-(cyclohexylmethyl)propane-1,3-diamine, N-(cyclohexylmethyl)butane-1,4-diamine, N-(cyclohexylmethyl)pentane-1,5-diamine, N-(cyclohexylmethyl)hexane-1,6-diamine, N-(cyclohexylmethyl)heptane-1,7-diamine, N-(cyclohexylmethyl)octane-1,8-diamine, N-(cyclohexylmethyl)nonane-1,9-diamine, N-(cyclohexylmethyl)decane-1,10-diamine, N-(cyclohexylmethyl)undecane-1,11-diamine, N-(cyclohexylmethyl)dodecane-1,12-diamine, N-(cyclohexylmethyl)benzene-1,4-diamine, N-(cyclohexylmethyl)benzene-1,3-diamine, N-(cyclohexylmethyl)benzene-1,2-diamine, N-(cyclohexylmethyl)cyclohexane-1,4-diamine, N-(cyclohexylmethyl)cyclohexane-1,3-diamine, N-(cyclohexylmethyl)cyclohexane-1,2-diamine, N-((4-aminomethyl)benzyl)-1-cyclohexylmethanamine, N-((3-aminomethyl)benzyl)-1-cyclohexylmethanamine, and N-((2-aminomethyl)benzyl)-1-cyclohexylmethanamine.

Further, examples thereof also include N-phenylethane-1,2-diamine, N-phenylpropane-1,3-diamine, N-phenylbutane-1,4-diamine, N-phenylpentane-1,5-diamine, N-phenylhexane-1,6-diamine, N-phenylheptane-1,7-diamine, N-phenyloctane-1,8-diamine, N-phenylnonane-1,9-diamine, N-phenyldecane-1,10-diamine, N-phenylundecane-1,11-diamine, N-phenyldodecane-1,12-diamine, N-phenylbenzene-1,4-diamine, N-phenylbenzene-1,3-diamine, N-phenylbenzene-1,2-diamine, N-phenylcyclohexane-1,4-diamine, N-phenylcyclohexane-1,3-diamine, N-phenylcyclohexane-1,2-diamine, N-((4-aminomethyl)benzyl)aniline, N-((3-aminomethyl)benzyl) aniline, and N-((2-aminomethyl)benzyl)aniline.

Additionally, examples thereof further include N-benzylethane-1,2-diamine, N-benzylpropane-1,3-diamine, N-benzylbutane-1,4-diamine, N-benzylpentane-1,5-diamine, N-benzylhexane-1,6-diamine, N-benzylheptane-1,7-diamine, N-benzyloctane-1,8-diamine, N-benzylnonane-1,9-diamine, N-benzyldecane-1,10-diamine, N-benzylundecane-1,11-diamine, N-benzyldodecane-1,12-diamine, N-benzylbenzene-1,4-diamine, N-benzylbenzene-1,3-diamine, N-benzylbenzene-1,2-diamine, N-benzylcyclohexane-1,4-diamine, N-benzylcyclohexane-1,3-diamine, N-benzylcyclohexane-1,2-diamine, N-((4-aminomethyl)benzyl)-1-phenylmethanamine, N-((3-aminomethyl)benzyl)-1-phenylmethanamine, and N-((2-aminomethyl)benzyl)-1-phenylmethanamine.

Examples thereof also include 2-(piperazin-1-yl)ethan-1-amine, 3-(piperazin-1-yl)propan-1-amine, 4-(piperazin-1-yl) butan-1-amine, 5-(piperazin-1-yl)pentan-1-amine, 6-(piperazin-1-yl)hexan-1-amine, 7-(piperazin-1-yl)heptan-1-amine, 8-(piperazin-1-yl)octan-1-amine, 9-(piperazin-1-yl)nonan-1-amine, 10-(piperazin-1-yl)decan-1-amine, 11-(piperazin-1-yl)undecan-1-amine, 12-(piperazin-1-yl)dodecan-1-amine, 4-(piperazin-1-yl)aniline, 3-(piperazin-1-yl)aniline, 2-(piperazin-1-yl)aniline, 4-(piperazin-1-yl)cyclohexan-1-amine, 3-(piperazin-1-yl)cyclohexan-1-amine, 2-(piperazin-1-yl)cyclohexan-1-amine, (4-(piperazin-1-ylmethyl)phenyl)methanamine, (3-(piperazin-1-ylmethyl)phenyl)methanamine, and (2-(piperazin-1-ylmethyl)phenyl)methanamine.

Further, examples thereof include 2-(piperidin-1-yl)ethan-1-amine, 3-(piperidin-1-yl)propan-1-amine, 4-(piperidin-1-yl) butan-1-amine, 5-(piperidin-1-yl)pentan-1-amine, 6-(piperidin-1-yl)hexan-1-amine, 7-(piperidin-1-yl)heptan-1-amine, 8-(piperidin-1-yl)octan-1-amine, 9-(piperidin-1-yl) nonan-1-amine, 10-(piperidin-1-yl)decan-1-amine, 11-(piperidin-1-yl)undecan-1-amine, 12-(piperidin-1-yl)dodecan-1-amine, 4-(piperidin-1-yl)aniline, 3-(piperidin-1-yl)aniline, 2-(piperidin-1-yl)aniline, 4-(piperidin-1-yl)cyclohexan-1-amine, 3-(piperidin-1-yl)cyclohexan-1-amine, 2-(piperidin-1-yl)cyclohexan-1-amine, (4-(piperidin-1-ylmethyl)phenyl)methanamine, (3-(piperidin-1-ylmethyl)phenyl)methanamine, and (2-(piperidin-1-ylmethyl)phenyl)methanamine.

Further, examples thereof also include 2-(piperidin-4-yl)ethan-1-amine, 3-(piperidin-4-yl)propan-1-amine, 4-(piperidin-4-yl) butan-1-amine, 5-(piperidin-4-yl)pentan-1-amine, 6-(piperidin-4-yl)hexan-1-amine, 7-(piperidin-4-yl)heptan-1-amine, 8-(piperidin-4-yl)octan-1-amine, 9-(piperidin-4-yl)nonan-1-amine, 10-(piperidin-4-yl)decan-1-amine, 11-(piperidin-4-yl)undecan-1-amine, 12-(piperidin-4-yl)dodecan-1-amine, 4-(piperidin-4-yl)aniline, 3-(piperidin-4-yl)aniline, 2-(piperidin-4-yl)aniline, 4-(piperidin-4-yl)cyclohexan-1-amine, 3-(piperidin-4-yl)cyclohexan-1-amine, 2-(piperidin-4-yl)cyclohexan-1-amine, (4-(piperidin-4-ylmethyl)phenyl)methanamine, (3-(piperidin-4-ylmethyl)phenyl)methanamine, and (2-(piperidin-4-ylmethyl)phenyl)methanamine.

Additionally, examples thereof further include N-heptylethane-1,2-diamine, N-heptylpropane-1,3-diamine, N-heptylbutane-1,4-diamine, N-heptylpentane-1,5-diamine, N-heptylhexane-1,6-diamine, N-heptylheptane-1,7-diamine, N-heptyloctane-1,8-diamine, N-heptylnonane-1,9-diamine, N-heptyldecane-1,10-diamine, N-heptylundecane-1,11-diamine, N-heptyldodecane-1,12-diamine, N-heptylbenzene-1,4-diamine, N-heptylbenzene-1,3-diamine, N-heptylbenzene-1,2-diamine, N-heptylcyclohexane-1,4-diamine, N-heptylcyclohexane-1,3-diamine, N-heptylcyclohexane-1,2-diamine, N-((4-aminomethyl)benzyl)heptan-1-amine, N-((3-aminomethyl)benzyl)heptan-1-amine, and N-((2-aminomethyl)benzyl)heptan-1-amine.

Examples thereof also include N-octylethane-1,2-diamine, N-octylpropane-1,3-diamine, N-octylbutane-1,4-diamine, N-octylpentane-1,5-diamine, N-octylhexane-1,6-diamine, N-octylheptane-1,7-diamine, N-octyloctane-1,8- diamine, N-octylnonane-1,9-diamine, N-octyldecane-1,10-diamine, N-octylundecane-1,11-diamine, N-octyldodecane-1,12-diamine, N-octylbenzene-1,4-diamine, N-octylbenzene-1,3-diamine, N-octylbenzene-1,2-diamine, N-octylcyclohexane-1,4-diamine, N-octylcyclohexane-1,3-diamine, N-octylcyclohexane-1,2-diamine, N-((4-aminomethyl)benzyl)octan-1-amine, N-((3-aminomethyl)benzyl)octan-1-amine, and N-((2-aminomethyl)benzyl)octan-1-amine.

Further, examples thereof include N-nonylethane-1,2-diamine, N-nonylpropane-1,3-diamine, N-nonylbutane-1,4-diamine, N-nonylpentane-1,5-diamine, N-nonylhexane-1,6-diamine, N-nonylheptane-1,7-diamine, N-nonyloctane-1,8-diamine, N-nonylnonane-1,9-diamine, N-nonyldecane-1,10-diamine, N-nonylundecane-1,11-diamine, N-nonyldodecane-1,12-diamine, N-nonylbenzene-1,4-diamine, N-nonylbenzene-1,3-diamine, N-nonylbenzene-1,2-diamine, N-nonylcyclohexane-1,4-diamine, N-nonylcyclohexane-1,3-diamine, N-nonylcyclohexane-1,2-diamine, N-((4-aminomethyl)benzyl)nonan-1-amine, N-((3-aminomethyl)benzyl)nonan-1-amine, and N-((2-aminomethyl)benzyl)nonan-1-amine.

Further, examples thereof also include N-decylethane-1,2-diamine, N-decylpropane-1,3-diamine, N-decylbutane-1,4-diamine, N-decylpentane-1,5-diamine, N-decylhexane-1,6-diamine, N-decylheptane-1,7-diamine, N-decyloctane-1,8-diamine, N-decylnonane-1,9-diamine, N-decyldecane-1,10-diamine, N-decylundecane-1,11-diamine, N-decyldodecane-1,12-diamine, N-decylbenzene-1,4-diamine, N-decylbenzene-1,3-diamine, N-decylbenzene-1,2-diamine, N-decylcyclohexane-1,4-diamine, N-decylcyclohexane-1,3-diamine, N-decylcyclohexane-1,2-diamine, N-((4-aminomethyl)benzyl)decan-1-amine, N-((3-aminomethyl)benzyl)decan-1-amine, and N-((2-aminomethyl)benzyl)decan-1-amine.

Additionally, examples thereof further include N-undecylethane-1,2-diamine, N-undecylpropane-1,3-diamine, N-undecylbutane-1,4-diamine, N-undecylpentane-1,5-diamine, N-undecylhexane-1,6-diamine, N-undecylheptane-1,7-diamine, N-undecyloctane-1,8-diamine, N-undecylnonane-1,9-diamine, N-undecyldecane-1,10-diamine, N-undecylundecane-1,11-diamine, N-undecyldodecane-1,12-diamine, N-undecylbenzene-1,4-diamine, N-undecylbenzene-1,3-diamine, N-undecylbenzene-1,2-diamine, N-undecylcyclohexane-1,4-diamine, N-undecylcyclohexane-1,3-diamine, N-undecylcyclohexane-1,2-diamine, N-((4-aminomethyl)benzyl)undecan-1-amine, N-((3-aminomethyl)benzyl)undecan-1-amine, and N-((2-aminomethyl)benzyl)undecan-1-amine.

Examples thereof also include N-dodecylethane-1,2-diamine, N-dodecylpropane-1,3-diamine, N-dodecylbutane-1,4-diamine, N-dodecylpentane-1,5-diamine, N-dodecylhexane-1,6-diamine, N-dodecylheptane-1,7-diamine, N-dodecyloctane-1,8-diamine, N-dodecylnonane-1,9-diamine, N-dodecyldecane-1,10-diamine, N-dodecylundecane-1,11-diamine, N-dodecyldodecane-1,12-diamine, N-dodecylbenzene-1,4-diamine, N-dodecylbenzene-1,3-diamine, N-dodecylbenzene-1,2-diamine, N-dodecylcyclohexane-1,4-diamine, N-dodecylcyclohexane-1,3-diamine, N-dodecylcyclohexane-1,2-diamine, N-((4-aminomethyl)benzyl)dodecan-1-amine, N-((3-aminomethyl)benzyl)dodecan-1-amine, and N-((2-aminomethyl)benzyl)dodecan-1-amine.

Further, examples thereof include N,N'-dimethylethane-1,2-diamine, N,N'-dimethylpropane-1,3-diamine, N,N'-dimethylbutane-1,4-diamine, N,N'-dimethylpentane-1,5-diamine, N,N'-dimethylhexane-1,6-diamine, N,N'-dimethylheptane-1,7-diamine, N,N'-dimethyloctane-1,8-diamine, N,N'-dimethylnonane-1,9-diamine, N,N'-dimethyldecane-1,10-diamine, N,N'-dimethylundecane-1,11-diamine, N,N'-dimethyldodecane-1,12-diamine, N,N'-dimethylbenzene-1,4-diamine, N,N'-dimethylbenzene-1,3-diamine, N,N'-dimethylbenzene-1,2-diamine, N,N'-dimethylcyclohexane-1,4-diamine, N,N'-dimethylcyclohexane-1,3-diamine, N,N'-dimethylcyclohexane-1,2-diamine, 1,1'-(1,4-phenylene)bis(N-methylmethanamine), 1,1'-(1,3-phenylene)bis(N-methylmethanamine), and 1,1'-(1,2-phenylene)bis(N-methylmethanamine).

The "compound forming the atomic group having NHx (x=0 to 2) (C)" mentioned above preferably has a structure in which NHx is a secondary amino group wherein x=1, the structure also having at least one primary amino group that reacts with the α,β-unsaturated carboxylic acid or a derivative thereof. When the substituent of the secondary amino group wherein X=1 is bulkier, the secondary amino group is less likely to be nucleophilically added to a carbonyl group. Thus, the primary amino group preferentially reacts to thereby enable the secondary amino group to be introduced to a side chain.

The "compound having NHx (x=0 to 2)", which is a compound that forms "the atomic group having NHx (x=0 to 2) (C)" in the modified block copolymer of the present embodiment satisfies the following condition:

(Condition): when the compound having NHx (x=0 to 2) is reacted with a maleic anhydride-modified group in a maleic anhydride-modified block copolymer, the MFR value at 230° C. under a load of 2.16 kg of the modified block copolymer after the reaction is 0.1 times or more the MFR value at 230° C. under a load of 2.16 kg of the maleic anhydride-modified block copolymer before the reaction.

The MFR value is preferably 0.3 times or more, more preferably 0.5 times or more.

Satisfying the condition described above can provide an effect of compatibilizing with a TPU.

In order to satisfy the condition, it is only required to suitably select the "compound having NHx (x=0 to 2)". Preferred examples thereof include N-benzylethylenediamine, N-(3-aminopropyl)cyclohexylamine, N-(5-aminopentyl)acetamide, N,N'-dimethyl-1,6-diaminohexane, and N-(2-aminoethyl)piperazine.

Additionally, the "compound having NHx (x=0 to 2)", which forms "the atomic group having NHx (x=0 to 2) (C)" in the modified block copolymer of the present embodiment more preferably satisfies the following condition:

(Condition): when a maleic anhydride modified group in a maleic anhydride-modified block copolymer is reacted with an equimolar amount of $H_2N$—R—$NHx$ (x=0 to 2, R is the same as the $R_1$), which is the compound having NHx (x=0 to 2), the MFR value at 230° C. under a load of 2.16 kg of the modified block copolymer after the reaction is 0.1 times or more the MFR value at 230° C. under a load of 2.16 kg of the maleic anhydride-modified block copolymer before the reaction. The MFR value is preferably 0.3 times or more, more preferably 0.5 times or more.

Satisfying the condition described above can provide an effect of compatibilizing with a polar resin.

In order to satisfy the condition, it is only required to suitably select the "compound having NHx (x=0 to 2)". Examples thereof include N-(3-aminopropyl)cyclohexylamine, N-benzylethylenediamine, N-(5-aminopentyl)acetamide, and N-(2-aminoethyl)piperazine.

In a more preferred aspect of the modified block copolymer of the present embodiment, the atomic group having NHx (C) has a structure of X—R1-NH—R2, wherein X has a structure in which a vinyl or α,β-unsaturated carboxylic acid derivative forms a chemical bond with the polymer block (A) and/or the polymer block (B) via graft modification, R1 is a C1-C22 hydrocarbon group, and R2 is a C1-C13 hydrocarbon group.

When the modified block copolymer has the form described above, hydrocarbon groups, which are originally less likely to be compatible with a polar resin, are not so abundant, and thus, an effect of compatibilizing with a polar resin can be achieved.

[Method for Producing Modified Block Copolymer]

The modified block copolymer of the present embodiment can be produced by, for example, but not limited to, polymerizing a vinyl aromatic compound and a conjugate diene compound in an organic solvent using an organic alkali metal compound as a polymerization initiator to obtain a block copolymer followed by performing a modification reaction.

The modified block copolymer preferably can be produced by performing a hydrogenation reaction and a modification reaction of a block copolymer. The hydrogenation reaction and modification reaction may not be necessarily performed in this order and may be performed in a reverse order. The polymerization form may be batch polymerization or continuous polymerization, or may be a combination thereof.

From the viewpoint of obtaining a block copolymer having a narrow molecular weight distribution and high strength, a batch polymerization method is preferred.

The polymerization temperature is generally 0 to 180° C., preferably 20 to 160° C., more preferably 30 to 150° C.

The polymerization time depends on the polymer intended, and is usually not more than 48 hours and preferably 0.1 to 10 hours. From the viewpoint of obtaining a block copolymer having a narrow molecular weight distribution and high strength, the polymerization time is more preferably 0.5 to 5 hours.

The atmosphere of the polymerization system, which is not particularly limited, is only required to be in a pressure range sufficiently maintaining nitrogen and the solvent in a liquid phase. The polymerization system preferably includes no impurities which may deactivate the polymerization initiator and the living polymer, such as water, oxygen and carbon dioxide.

Examples of the organic solvent include, but are not limited to, aliphatic hydrocarbons, such as n-butane, isobutane, n-pentane, n-hexane, n-heptane, and n-octane; alicyclic hydrocarbons, such as cyclohexane, cycloheptane, and methylcyclopentane; and aromatic hydrocarbons, such as benzene, xylene, toluene, and ethylbenzene.

The organic alkali metal compound as the polymerization initiator is preferably an organic lithium compound.

As the organic lithium compound, organic monolithium compounds, organic dilithium compounds, and organic polylithium compounds are used.

Examples of the organic lithium compound include, but are not limited to, ethyllithium, n-propyllithium, isopropyllithium, n-butyllithium, sec-butyllithium, t-butyllithium, n-pentyllithium, n-hexyllithium, benzyllithium, phenyllithium, hexametylenedilithium, butadienyllithium, isopropenyldilithium, and lithium piperidide.

In the case where an organic lithium compound containing N, such as lithium piperidide, is used as a polymerization initiator, provided is a modified block copolymer having an atomic group with NHx wherein X=0.

Only one of these may be used singly, and two or more of these may be used in combination. Of these, from the viewpoint of polymerization activity, n-butyllithium, sec-butyllithium, and lithium piperidide are preferred.

The amount of the organic alkali metal compound used as the polymerization initiator depends on the molecular weight of the block copolymer intended, and is generally preferably in the range of 0.01 to 0.5 phm (parts by mass per 100 parts by mass of the monomer), more preferably in the range of 0.03 to 0.3 phm, further preferably in the range of 0.05 to 0.2 phm.

The amount of vinyl bonds of the modified block copolymer can be controlled using a Lewis base, for example, a compound such as an ether and amine as an agent for adjusting the amount of vinyl bonds (hereinafter referred to as a vinylation reagent).

The amount of the vinylation reagent to be used can be adjusted depending on the amount of vinyl bonds intended.

Examples of the vinylation reagent include, but are not limited to, ether compounds and tertiary amine compounds.

Examples of the ether compound include linear ether compounds and cyclic ether compounds.

Examples of the linear ether compound include, but are not limited to, dialkyl ether compounds of ethylene glycol such as dimethyl ether, diethyl ether, diphenyl ether, ethylene glycol dimethyl ether, ethylene glycol diethyl ether, and ethylene glycol dibutyl ether, and dialkyl ether compounds of diethylene glycol such as diethylene glycol dimethyl ether, diethylene glycol diethyl ether, and diethylene glycol dibutyl ether.

Examples of the cyclic ether compound include, but are not limited to tetrahydrofuran, dioxane, 2,5-dimethyl oxolane, 2,2,5,5-tetramethyl oxolane, 2,2-bis(2-oxolanyl)propane, and alkyl ethers of furfuryl alcohol.

Examples of the tertiary amine compound include, but are not limited to, trimethylamine, triethylamine, tributylamine, N,N-dimethylaniline, N-ethylpiperidine, N-methylpyrrolidine, N,N,N',N'-tetramethylethylenediamine, N,N,N',N'-tetraethylethylenediamine, 1,2-dipiperidinoethane, trimethylaminoethylpiperazine, N,N,N',N'',N''-pentamethylethylenetriamine, N,N'-dioctyl-p-phenylenediamine, pyridine, tetramethylpropanediamine, and bis[2-(N,N-dimethylamino)ethyl]ether.

Only one of these may be used singly, and two or more of these may be used in combination.

Preferable tertiary amine compounds are compounds having two amines. Furthermore, of these, compounds having a structure showing symmetry in the molecule are more preferable, and N,N,N',N'-tetramethylethylenediamine, bis[2-(N,N-dimethylamino)ethyl]ether, and 1,2-dipiperidinoethane are even more preferable.

In the step of producing the modified block copolymer of the present embodiment, copolymerization of a block copolymer may be performed under coexistence of the vinylation reagent, organic lithium compound, and alkali metal alkoxide mentioned above.

The alkali metal alkoxide herein is a compound represented by the general formula MOR, wherein M is an alkali metal, and R is an alkyl group.

The alkali metal of the alkali metal alkoxide is preferably sodium or potassium from the viewpoint of a high amount of vinyl bonds, a narrow molecular weight distribution, a high polymerization speed, and a high block ratio.

Examples of the alkali metal alkoxide include, but are not limited to, preferably sodium alkoxides, lithium alkoxides, and potassium alkoxides having an alkyl group having 2 to 12 carbon atoms, more preferably sodium alkoxides and potassium alkoxides having an alkyl group having 3 to 6 carbon atoms, further preferably sodium-t-butoxide, sodium-t-pentoxide, potassium-t-butoxide, and potassium-t-pentoxide.

Of these, sodium alkoxides such as sodium-t-butoxide and sodium-t-pentoxide are still even more preferable.

The modified block copolymer of the present embodiment is hydrogenated, and the polymer block comprising a conjugate diene compound as a main constituent (B) is a hydrogenated product.

The hydrogenation method is not particularly limited. For example, hydrogenating the block copolymer obtained above by supplying hydrogen in the presence of a hydrogenation catalyst can provide a hydrogenated block copolymer in which double bond residues of the conjugate diene compound unit have been hydrogenated.

The hydrogenation rate can be controlled by means of the amount of the catalyst during hydrogenation, for example. The hydrogenation rate can be controlled by means of the amount of the catalyst during hydrogenation, amount of hydrogen fed, pressure, temperature and the like.

In the method for producing the modified block copolymer of the present embodiment, examples of a method for introducing the atomic group having NHx (x=0 to 2) (C) to a side chain of the polymer block comprising a vinyl aromatic compound as a main constituent (A) and/or the polymer block comprising a conjugate diene compound as a main constituent (B) include a production method of directly grafting the atomic group having NHx (x=0 to 2) (C), and in the case where the atomic group having NHx (x=0 to 2) (C) can be obtained as a reaction product of an α,β-unsaturated carboxylic acid or a derivative thereof and a compound having NHx (x=0 to 2), a production method in which the α,β-unsaturated carboxylic acid or a derivative thereof is introduced to a side chain of the polymer block comprising a vinyl aromatic compound as a main constituent (A) and/or the polymer block comprising a conjugate diene compound as a main constituent (B) and the compound having NHx (x=0 to 2) is reacted with the α,β-unsaturated carboxylic acid or a derivative thereof.

In the case of the production method in which the atomic group having NHx (x=0 to 2) (C) is directly grafted to introduce the atomic group having NHx (x=0 to 2) (C) to a side chain of the polymer block comprising a vinyl aromatic compound as a main constituent (A) and/or the polymer block comprising a conjugate diene compound as a main constituent (B), an example of the method is a production method in which the atomic group having NHx (x=0 to 2) (C) is radically added to the block copolymer containing the polymer block comprising a vinyl aromatic compound as a main constituent (A) and polymer block comprising a conjugate diene compound as a main constituent (B) in the presence of a radical initiator.

In the case of the production method in which the atomic group having NHx (x=0 to 2) (C) is obtained as a reaction product of an α,β-unsaturated carboxylic acid or a derivative thereof and a compound having NHx (x=0 to 2), the α,β-unsaturated carboxylic acid or a derivative thereof is introduced to a side chain of the polymer block comprising a vinyl aromatic compound as a main constituent (A) and/or the polymer block comprising a conjugate diene compound as a main constituent (B), and the compound having NHx (x=0 to 2) is reacted with the α,β-unsaturated carboxylic acid or a derivative thereof, examples of a molecular unit containing the α,β-unsaturated carboxylic acid or a derivative thereof include maleic acid, halogenated maleic acid, itaconic acid, cis-4-cyclohexen-1,2-dicarboxylic acid, endo-cis-bicyclo[2,2,1]-5-hepten-2,3-dicarboxylic acid and anhydrides of these dicarboxylic acids, acrylic acid, methacrylic acid, crotonic acid, and monocarboxylates thereof such as methyl methacrylate and glycidyl methacrylate. Anhydrides are preferred, and of these, maleic anhydride is more preferred from the viewpoint of reactivity.

The amount of the molecular unit containing the α,β-unsaturated carboxylic acid or a derivative thereof to be added is preferably 0.1 to 20 parts by mass, more preferably 0.1 to 10 parts by mass, further preferably 0.1 to 5 parts by mass based on the block copolymer of 100 parts by mass. From the viewpoint of the compatibility of a polar resin composition, the amount to be added is preferably 0.1 parts by mass or more. Meanwhile, from the viewpoint of the flowability of the modified block copolymer, the amount to be added is preferably 20 parts by mass or less.

An example of a method for producing an acid-modified block copolymer in which an α,β-unsaturated carboxylic acid or a derivative thereof is bonded to the polymer block (A) and/or the polymer block (B) is, but not particularly limited to, a method of performing a step of graft-adding the α,β-unsaturated carboxylic acid and/or a derivative thereof to the block copolymer.

Examples of the graft addition method include a production method in which, in a solution containing a radical initiator, a block copolymer, and a compound containing an α,β-unsaturated carboxylic acid or a derivative group thereof, these components are reacted; a production method in which a radical initiator, a block copolymer, and a compound containing an α,β-unsaturated carboxylic acid or a derivative group thereof are reacted under heating and melting; a production method in which a block copolymer and a compound containing an α,β-unsaturated carboxylic acid or a derivative group thereof, without a radical initiator, are reacted under heating and melting; and a production method in which a compound that reacts with both a block copolymer and a compound containing an α,β-unsaturated carboxylic acid or a derivative group thereof to thereby form a bond, a block copolymer, and a compound containing an α,β-unsaturated carboxylic acid or a derivative group thereof are reacted in a solution containing these components or under heating and melting.

Particularly preferred is the production method in which a radical initiator, a block copolymer, and a compound containing an α,β-unsaturated carboxylic acid group or a derivative group thereof are reacted under heating and melting.

Examples of a reaction method include methods of melt-kneading each component using a common mixer such as a Banbury mixer, single screw extruder, twin screw extruder, co-kneader, or multiscrew extruder. Preferred is a method in which a single screw, twin screw, or multiscrew extruder is used, from the viewpoint of the cost and production stability. In this case, raw materials may be introduced in a batch manner, may be dry-blended and introduced in a batch manner, or may be separately fed. Particularly, from the viewpoint of the production stability, a method of feeding raw materials separately is preferred. Alternatively, the same raw material may be added stepwise.

In this case, the number of revolutions of the screw(s) is preferably 50 to 400 rpm, more preferably 100 to 350 rpm from the viewpoint of uniformly adding the compound containing an α,β-unsaturated carboxylic acid or a derivative group thereof to the uniform block copolymer, and is preferably 150 to 300 rpm from the viewpoint of resin degradation due to shearing and uniform addition.

The kneading temperature is a temperature at which the block copolymer melts and a radical is generated from the radical generator, and is 100° C. to 350° C. From the viewpoint of controlling the amount to be added and suppressing resin degradation by heat, the kneading temperature is more preferably 120° C. to 300° C., more preferably 150° C. to 270° C.

In order to suppress deactivation of radical active species by oxygen, melt-kneading may be performed under an inert gas such as nitrogen.

Examples of a radical generator to be used include ketone peroxides, peroxyketals, hydroperoxides, dialkyl peroxides, diacyl peroxides, peroxyesters, and peroxycarbonates. Preferred are those having a one-minute half-life temperature in the kneading temperature range. Of these, preferred are those of which one-minute half-life temperature remains in the kneading temperature range. More preferred are those having a one-minute half-life temperature in the range of 150° C. to 250° C., and examples thereof include 1,1-di(t-hexylperoxy) cyclohexane, 1,1-di(t-butylperoxy)cyclohexane, 2,2-di(4,4-di-(t-butylperoxy) cyclohexyl)propane, t-hexylperoxyisopropyl monocarbonate, t-butylperoxymaleic acid, t-butylperoxy-3,5,5-trimethylhexanoate, t-butylperoxy lauric acid, t-butylperoxyisopropyl monocarbonate, t-butylperoxy 2-ethylhexyl monocarbonate, t-hexylperoxy benzoate, 2,5-dimethyl-2,5-di(benzoylperoxy)hexane, t-butylperoxy acetate, 2,2-di-(t-butylperoxy)butane, t-butylperoxy benzoate, n-butyl-4,4-di-(t-butylperoxy)valerate, di(2-t-butylperoxyisopropyl)benzene, dicumyl peroxide, di-t-hexyl peroxide, 2,5-dimethyl-2,5-di(t-butylperoxy) hexane, t-butylcumyl peroxide, di-t-butyl peroxide, p-methane hydroperoxide, 2,5-dimethyl-2,5-di(t-butylperoxy)hexyne-3, diisopropylbenzene hydroperoxide, and 1,1,3,3-tetramethylbutyl hydroperoxide. Particularly, from the viewpoint of the compatibility with the block copolymer, di(2-t-butylperoxyisopropyl)benzene, dicumyl peroxide, di-t-hexyl peroxide, 2,5-dimethyl-2,5-di(t-butylperoxy)hexane, t-butylcumyl peroxide, di-t-butyl peroxide, and 2,5-dimethyl-2,5-di(t-butylperoxy)hexine-3 are preferred. Of these, 2,5-dimethyl-2,5-di(t-butylperoxy)hexane and 2,5-dimethyl-2,5-di(t-butylperoxy)hexine-3 are preferred. The molar equivalents of the compound containing an $\alpha,\beta$-unsaturated carboxylic acid or a derivative group thereof is preferably 300 molar equivalents or less, more preferably 200 molar equivalents or less, more preferably 100 molar equivalents or less, with respect to the radical generator.

Within the range of these conditions, the compound containing an $\alpha,\beta$-unsaturated carboxylic acid or a derivative group thereof can be added in an amount of more than 0 parts by mass to of the order of 10 parts by mass based on 100 parts by mass of the block copolymer.

A reaction method for reacting the acid-modified block copolymer obtained as mentioned above with a compound having NHx (x=0 to 2) is not particularly limited, and known methods can be employed.

Examples of the method include methods of dry-blending the acid-modified block copolymer and a compound having NHx (x=0 to 2) and then melt-kneading the components using a common mixer such as a Banbury mixer, single screw extruder, twin screw extruder, co-kneader, or multi-screw extruder, and methods of dissolving or dispersive mixing the components and then heat-removing the solvent.

In the present embodiment, melt-kneading methods with an extruder are preferred from the viewpoint of productivity and good kneadability.

Examples of the shape of the modified block copolymer to be obtained include, but are not particularly limited to, pellets, sheets, strands, and chips. After melt-kneaded, the modified block copolymer can be formed directly into a molded article.

Performing a step of graft-adding an $\alpha,\beta$-unsaturated carboxylic acid and/or a derivative thereof to the block copolymer mentioned above and then performing a step of reacting an asymmetric diamine with the $\alpha,\beta$-unsaturated carboxylic acid and/or a derivative thereof is preferred from the view point of quantitative introduction of the modified group, because, due to the difference in the reactivity between each amine and acid-modified groups in the acid-modified block copolymer, one amine preferentially reacts with an acid-modified group and the other amine can be added as a modified group to the block copolymer, and additionally, crosslinking of the acid-modified block copolymer due to the compound having NHx (x=0 to 2) can be suppressed.

An asymmetric diamine refers to a diamine having two amino groups each having a different number of substituents in one molecule. An example is a diamine having a secondary amine at one terminal. Specific examples thereof preferably include N-methyl-1,6-diaminobutane, N-methyl-1,6-diaminohexane, N-(3-aminopropyl)cyclohexylamine, N-benzylethylenediamine, N-(5-aminopentyl)acetamide, and N-(2-aminoethyl)piperazine.

The substituent of the secondary amine is preferably a C2 or higher hydrocarbon group from the viewpoint of reaction selectivity and crosslinking suppression. Examples of the secondary amine preferably include N-(3-aminopropyl)cyclohexylamine, N-benzylethylenediamine, N-(5-aminopentyl)acetamide, and N-(2-aminoethyl)piperazine.

As for the blend ratio between the acid-modified block copolymer and a compound having NHx (x=0 to 2), from the viewpoint of a quantitative reaction, economic efficiency, and removal of unreacted materials, the compound having NHx (x=0 to 2) is blended in an amount of preferably 0.3 molar equivalents or more and 2.0 molar equivalents or less, more preferably 0.3 molar equivalents or more and 1.8 molar equivalents or less, further preferably 0.4 molar equivalents or more and 1.5 molar equivalents or less, further more preferably 0.5 molar equivalents or more and 1.3 molar equivalents or less with respect to the carboxylic acid group or a derivative group thereof in the acid-modified block copolymer.

The modified block copolymer of the present embodiment is hydrogenated, and the polymer block comprising a conjugate diene compound as a main constituent (B) is a hydrogenated product.

The hydrogenation method is as mentioned above. The hydrogenation reaction step is preferably performed at the timing after the production reaction of the block copolymer before hydrogenation is stopped.

Pelletizing the modified block copolymer of the present embodiment can produce pellets of the modified block copolymer.

Examples of the pelletizing method include a method including extruding the modified block copolymer in a strand form from a single screw or twin screw extruder and cutting the extruded product in water with a rotary blade installed at the front face of a die portion; a method including extruding the modified block copolymer in a strand form from a single screw or twin screw extruder and cutting the extruded product with a strand cutter after water cooling or air cooling; and a method including molding the modified block copolymer into a sheet form with a roll after melt mixing with an open roll or Banbury mixer, further, cutting the sheet into strips, and thereafter cutting the strips into cuboidal pellets with a pelletizer.

Note that the size and shape of a pellet are not particularly limited.

An antiblocking agent for pellets can be blended in the modified block copolymer of the present embodiment in the pellets thereof, as required, in order to prevent blocking of the pellets.

Examples of the antiblocking agent for pellets include, but are not limited to, calcium stearate, magnesium stearate, zinc stearate, polyethylene, polypropylene, ethylene bis stearylamide, talc, and amorphous silica.

From the viewpoint of transparency of a random polypropylene composition to be obtained and tubular molded bodies and sheet-like molded bodies including the composition, preferred are calcium stearate, polyethylene, and polypropylene.

A preferred amount of the antiblocking agent for pellets is 500 to 6,000 ppm with respect to the modified block copolymer. A more preferred amount thereof is 1,000 to 5,000 ppm with respect to the modified block copolymer. Although the antiblocking agent for pellets is preferably blended while being attached to the surface of the pellets, the agent can be contained also inside the pellets to some extent.

[Resin Composition]

The resin composition of the present embodiment contains the modified block copolymer of the present embodiment mentioned above and a thermoplastic polyurethane.

A thermoplastic polyurethane is a resin constituted by diisocyanate, a long-chain polyol, and a chain extender (short-chain diol) and having a urethane bond (—NH—COO—) in the molecule.

The thermoplastic polyurethane includes hard segments constituted mainly by diisocyanate and a chain extender and soft segments constituted mainly by diisocyanate and a long-chain polyol, having rubber elasticity.

The thermoplastic polyurethane is a resin preferably obtained by reacting a polymer polyol having a number average molecular weight of 500 to 10,000 or an organic diisocyanate with a chain extender.

Examples of the long-chain polyol having a number average molecular weight of 500 to 10,000 include, but are not limited to, polyester diol, polyester polyol, polyether diol, polyether polyol, polyester ether diol, polycaprolactone polyol, polycarbonate diol, polycarbonate polyol, polyester carbonate diol, polybutadiene polyol, and castor oil polyol.

Examples of raw materials for the polyester polyol include dibasic acids such as adipic acid, terephthalic acid, isophthalic acid, succinic acid, sebacic acid, and dimer acid, aromatic diols, alicyclic diols, aliphatic diols such as ethylene glycol, 1,4-butanediol, 1,5-pentanediol, 1,6-hexanediol, 3-methyl-1,5-pentanediol, 1,9-nonanediol, propylene glycol, diethylene glycol, and neopentyl glycol, and trimethylol propane.

Examples of the polyether polyol include polypropylene glycol, polytetramethylene ether glycol, and polyoxytetramethylene glycol.

Examples of the polycaprolactone polyol include polymers of ε-caprolactone obtained by using a compound having a hydroxyl group such as an aromatic diol, alicyclic diol, aliphatic diol such as ethylene glycol, 1,4-butanediol, 1,5-pentanediol, 1,6-hexanediol, 3-methyl-1,5-pentanediol, 1,9-nonanediol, propylene glycol, diethylene glycol, or neopentyl glycol, or trimethylolpropane as an initiator.

Examples of the polycarbonate polyol include products of transesterification between an aromatic diol, alicyclic diol, aliphatic diol such as ethylene glycol, 1,4-butanediol, 1,5-pentanediol, 1,6-hexanediol, 3-methyl-1,5-pentanediol, 1,9-nonanediol, propylene glycol, diethylene glycol, or neopentyl glycol, trimethylolpropane or the like, and a diester carbonate such as dimethyl carbonate.

Polybutadiene polyol is polybutadiene having a hydroxyl group at its terminal.

Castor oil polyol is an ester of an unsaturated fatty acid collected from seeds of castor bean with glycerin.

Examples of the organic diisocyanate include, but are not limited to, aromatic diisocyanates such as diphenylmethane diisocyanate, tolylene diisocyanate, xylylene diisocyanate, tetramethylxylylene diisocyanate, and 1,5-naphthalene diisocyanate, alicyclic diisocyanates such as isophorone diisocyanate, dicyclohexylmethane diisocyanate, hydrogenated xylylene diisocyanate, and norbornene diisocyanate, and aliphatic diisocyanates such as hexamethylene diisocyanate, trimethylhexamethylene diisocyanate, and 1,5-pentamethylene diisocyanate.

Examples of the chain extender include, but are not limited to aromatic diols, alicyclic diols, aliphatic diols such as 1,4-butanediol, 1,5-pentanediol, 1,6-hexanediol, 3-methyl-1,5-pentanediol, 1,9-nonanediol, and neopentyl glycol, and trimethylolpropane.

Here, the number average molecular weight of the polymer polyol can be determined by performing measurement by gel permeation chromatography (GPC) and using a calibration curve obtained by measurement on commercially available standard polystyrene (formed by the peak molecular weight of standard polystyrene), from the molecular weights of peaks of a chromatogram.

The resin composition of the present embodiment preferably contains 1 to 70% by mass of the modified block copolymer of the present embodiment and 30 to 99% by mass of a thermoplastic polyurethane from the viewpoint of abrasion resistance and mechanical strength.

From the viewpoint described above, the resin composition contains preferably 5 to 60% by mass of the modified block copolymer and 40 to 95% by mass of a thermoplastic polyurethane, more preferably 15 to 55% by mass of the modified block copolymer and 45 to 85% by mass of a thermoplastic polyurethane, further preferably 25 to 50% by mass of the modified block copolymer and 50 to 75% by mass of a thermoplastic polyurethane.

The resin composition of the present embodiment may contain a polyolefin in addition to the modified block copolymer of the present embodiment and the thermoplastic polyurethane.

Preferable examples of the polyolefin include, but are not limited to, polypropylene resins and polyethylene resins from the viewpoint of mechanical strength.

Examples of the polypropylene resin to be used include, but are not limited to, crystalline propylene homopolymers, crystalline ethylene-propylene copolymers, and crystalline propylene-α-olefin copolymers.

Only one of these may be used singly, and two or more of these may be used in combination.

Examples of the crystalline ethylene-propylene copolymer include, but are not limited to, crystalline ethylene-propylene block copolymers composed of propylene homopolymer portions and ethylene-propylene random copolymer portions.

Examples of an α-olefin to be used in crystalline propylene-α-olefin copolymers include, but are not limited to, α-olefins having 4 or more carbon atoms, preferably α-olefins having 4 to 20 carbon atoms, more preferably α-olefins having 4 to 12 carbon atoms.

Examples of such an α-olefin include, but are not limited to 1-butene, 1-pentene, 1-hexene, 1-heptene, 1-octene, and 1-decene.

Examples of the crystalline propylene-α-olefin copolymer include, but are not limited to, crystalline propylene-1-butene copolymers and crystalline propylene-1-hexene copolymers.

Of these, a crystalline propylene homopolymer, crystalline ethylene-propylene block copolymer, or mixture thereof is preferred.

Examples of the polyethylene resin include low density polyethylene, linear low density polyethylene, high density polyethylene, and copolymers of ethylene and an α-olefin having 3 to 8 carbon atoms.

In the case of a copolymer of ethylene and an α-olefin having 3 to 8 carbon atoms, examples of the α-olefin include propylene, butene-1, isobutene, pentene-1, hexene-1,4-methylpentene-1, and octene-1. In this case, the content of the α-olefin in the copolymer is preferably 30% by mass or less.

In the case where the resin composition of the present embodiment is a resin composition containing the modified block copolymer of the present embodiment, a thermoplastic polyurethane, and a polyolefin, from the viewpoint of abrasion resistance and mechanical strength, the resin composition preferably contains 1 to 98% by mass of the modified block copolymer of the present embodiment, 1 to 98% by mass of the thermoplastic polyurethane, and 1 to 98% by mass of the polyolefin.

The resin composition contains more preferably 3 to 85% by mass of the modified block copolymer, 10 to 92% by mass of the thermoplastic polyurethane, and 3 to 87% by mass of the polyolefin, further preferably 4 to 53% by mass of the modified block copolymer, 40 to 89% by mass of the thermoplastic polyurethane, and 7 to 56% by mass of the polyolefin, further more preferably 5 to 35% by mass of the modified block copolymer, 55 to 85% by mass of the thermoplastic polyurethane, and 10 to 40% by mass of the polyolefin.

The resin composition of the present embodiment is a resin composition that contains 1 to 98% by mass of a modified block copolymer containing a polymer block comprising a vinyl aromatic compound as a main constituent (A), a polymer block comprising a conjugate diene compound as a main constituent (B), and an atomic group having $NH_x$ (x=1) (C), 1 to 98% by mass of a thermoplastic polyurethane, and 1 to 98% by mass of a polyolefin.

Furthermore, in a preferred aspect of the resin composition according to the present embodiment, the polymer block comprising a conjugate diene compound as a main constituent (B) is a hydrogenated product, the atomic group having $NH_x$ (x=1) (C) has a structure of X—R1-NH—R2, R1 is a C2-C22 substituted or unsubstituted, saturated or unsaturated hydrocarbon group, R2 is a C2-C13 substituted or unsubstituted, saturated or unsaturated hydrocarbon group, X has a structure in which a carbon-carbon unsaturated bond forms a chemical bond with the polymer block (A) and/or the polymer block (B) via graft modification, and a compound having $NH_x$ (x=0 to 2) that forms the atomic group having $NH_x$ (x=0 to 2) (C) satisfies the following condition:

(Condition): when a maleic anhydride modified group in a maleic anhydride-modified block copolymer is reacted with an equimolar amount of $H_2N$—R—$NH_x$ (x=0 to 2, R is a C2-C22 substituted or unsubstituted, saturated or unsaturated hydrocarbon group), which is the compound having $NH_x$ (x=0 to 2), the MFR value at 230° C. under a load of 2.16 kg of the modified block copolymer after the reaction is 0.1 times or more the MFR value at 230° C. under a load of 2.16 kg of the maleic anhydride-modified block copolymer before the reaction.

[Method for Producing Resin Composition]

A method for producing a resin composition containing the modified block copolymer of the present embodiment is not particularly limited, and known methods can be employed.

For example, methods of melt-kneading the components using a common mixer such as a Banbury mixer, single screw extruder, twin screw extruder, co-kneader, or multi-screw extruder, methods of dissolving or dispersive mixing the components and then removing the solvent by heating, and the like are used.

In the present embodiment, melt-kneading methods with an extruder are preferred from the viewpoint of productivity and good kneadability. Examples of the shape of the resin composition to be obtained include, but are not particularly limited to, pellets, sheets, strands, and chips. After melt-kneaded, the resin composition can be formed directly into a molded article.

The resin composition containing the modified block copolymer of the present embodiment can be processed into practically useful molded articles by conventionally known methods such as extrusion, injection molding, two-color injection molding, sandwich molding, hollow molding, compression molding, vacuum molding, rotational molding, powder slush molding, foaming molding, laminating molding, calendering, and blow molding.

Also, as required, processing such as foaming, powdering, stretching, adhesion, printing, painting, and plating may be performed.

According to such molding methods, the resin composition can be exploited for sheets, films, injection molded articles, hollow molded articles, pressure molded articles, vacuum molded articles, extruded articles, and foaming molded articles of various shapes, molded articles such as non-woven fabric and fibers, and a variety of molded articles such as synthetic leather. These molded articles can be exploited for automotive interior/exterior materials, building materials, toys, parts of consumer electrical appliances, medical devices, industrial parts, other sundry goods, and the like.

EXAMPLES

Hereinafter the present embodiment will be described in detail by way of specific Examples and Comparative Examples, but the present embodiment is not limited to Examples and Comparative Examples below in any ways.

In Examples and Comparative Examples, the structure and physical properties of polymers were measured as follow.

((1) Content of Each Polymer Block in Modified Block Copolymer)

About 20 mL of a polymer solution sampled in each step of a polymerization process for a modified block copolymer before hydrogenation was poured into a 100 mL bottle in which 0.50 mL of n-propylbenzene as an internal standard and about 20 mL of toluene were enclosed to thereby produce a sample.

The sample was measured by a gas chromatography (manufactured by SHIMADZU CORPORATION: GC-14B)

equipped with a packed column carrying apiezon grease. The amount of a residual monomer in the polymer solution was determined from calibration curves of a butadiene monomer and a styrene monomer, obtained in advance. The polymerization ratio of the butadiene monomer and styrene monomer was confirmed to be 100%, and the content of each polymer block was calculated by the following expression.

The polymerization ratio of butadiene was measured at 90° C. constant, and the polymerization ratio of styrene was measured under a condition of raising the temperature from 90° C. (held for 10 minutes) to 150° C. (10° C./minute).

Content of each block=[(total amount of the monomer fed in each step)/(total amount of the monomer)]×100% by mass ((2) Amount of Vinyl Bonds Before Hydrogenation of Modified Block Copolymer)

Polymers sampled in each step of a polymerization process of a modified block copolymer before hydrogenation and in the course of polymerization of the polymer block (B) were measured by a proton nuclear magnetic resonance ($^1$H-NMR) method.

ECS400 (manufactured by JEOL) as a measuring apparatus and deuterated chloroform as a solvent were used. The measurement was performed under conditions of sample concentration: 50 mg/mL, observation frequency: 400 MHz, chemical shift reference: tetramethylsilane, pulse delay: 2.904 seconds, number of times of scanning: 64, pulse width: 45°, and measurement temperature: 26° C.

The amount of vinyl bonds was calculated from the ratios of 1,4-bonds and 1,2-bonds after an integrated value of signals per 1H of each bond was calculated from an integrated value of signals attributed to 1,4-bonds and 1,2-bonds.

((3) Degree of Hydrogenation of Unsaturated Bond Based on Conjugate Diene Compound Unit of Hydrogenated Modified Block Copolymer)

Polymers after hydrogenation were used to measure the degree of hydrogenation by means of proton nuclear magnetic resonance ($^1$H-NMR).

The measurement conditions and the method for processing measurement data were the same as (2) described above.

The degree of hydrogenation was determined by calculating integrated values of signals derived from remaining double bonds at 4.5 to 5.5 ppm and signals derived from hydrogenated conjugated diene, and calculating ratios thereof.

((4) Butylene Content and/or Propylene Content Based on 100 Mol % in Total of Conjugate Diene Compound Unit in Hydrogenated Modified Block Copolymer)

The hydrogenated modified block copolymer was used for measurement by means of proton nuclear magnetic resonance ($^1$H-NMR).

The measurement conditions and the method for processing measurement data were the same as (2) and (3) described above.

The integrated values derived from the signals derived from the total amount of conjugate diene compound units and those derived from butylene content and/or propylene content in the hydrogenated modified block copolymer were calculated, and the ratio thereof were calculated.

For calculating the butylene ratio, the integrated value of signals attributed to butylene (hydrogenated 1,2-bonds) at 0 to 2.0 ppm of the spectrum was used.

((5) Content of Vinyl Aromatic Compound Unit of Modified Block Copolymer (Hereinafter Also Referred to as "Styrene Content"))

The modified block polymer was used for measurement by means of a proton nuclear magnetic resonance (H1-NMR) method.

ECS400 (manufactured by JEOL) as a measuring apparatus and deuterated chloroform as a solvent were used. The measurement was performed under conditions of sample concentration: 50 mg/mL, observation frequency: 400 MHz, chemical shift reference: tetramethylsilane, pulse delay: 2.904 seconds, number of times of scanning: 64, pulse width: 45°, and measurement temperature: 26° C. The styrene content was calculated using an accumulated value of the total styrene aromatic signals at 6.2 to 7.5 ppm of the spectrum.

The styrene content of the block (A) was confirmed also by calculating the content of the vinyl aromatic compound unit of each polymer sampled in each step of a polymerization process for a block copolymer before hydrogenation.

((6) Weight Average Molecular Weight and Molecular Weight Distribution of Modified Block Copolymer)

GPC [Apparatus: LC-10 (manufactured by SHIMADZU CORPORATION), column: TSKgelGMHXL (4.6 mm×30 cm)] was used for measurement.

Tetrahydrofuran was used as a solvent.

The weight average molecular weight was determined using a calibration curve obtained by measurement of commercially available standard polystyrene (formed by the peak molecular weight of standard polystyrene), from the molecular weight of a peak of a chromatogram.

When a plurality of peaks was present on the chromatogram, the molecular weight was determined, as a weight average molecular weight, from the molecular weight of each peak and the composition ratio of each peak (determined from the area ratio of each peak on the chromatogram).

The molecular weight distribution was calculated from the ratio between the weight average molecular weight (Mw) and number average molecular weight (Mn) obtained.

((7) Amount of Acid Anhydride Added in Acid Anhydride-Modified Hydrogenated Block Copolymer)

The acid anhydride-modified hydrogenated block copolymer was dissolved in toluene, and the solution was titrated with a methanol solution of sodium methoxide having a factor of 1±0.05 to calculate the amount of acid anhydride added of the acid anhydride-modified hydrogenated block copolymer.

((8) Reaction Ratio Between Compound Having NHx (x=0 to 2) and Acid Anhydride)

An infrared spectrophotometer (manufactured by Thermo Fisher scientific, Nicolet iS10 FT-IR Spectrometer) was used, and the reaction ratio was calculated from the decrease in the peak of the acid anhydride.

When the acid anhydride was maleic anhydride, the reaction ratio was calculated from the decrease in the peak around 1790 cm$^{-1}$ derived from maleic anhydride.

((9) Number of Modified Group Per Polymerized Chain)

The number of modified groups per polymerized chain was calculated by the following expression. (Number of modified groups per polymerized chain)=(Theoretical molecular weight of the unmodified copolymer determined from the amount of the monomer to be used for polymerization, the amount of polymerization initiator, and the hydrogenation rate)×Amount of the acid anhydride added (parts)/100 (parts)/Molecular weight of the acid anhydride× (Reaction ratio between the compound having NHx (x=0 to 2) and the acid anhydride)

(Number of Modified Group Per Polymerized Chain in Terminal-Modified Block Copolymer)

With application of a property of modified components to adsorb to a GPC column including silica gel as filler, and in respect to a sample solution containing a modified block copolymer and a low-molecular-weight internal standard polystyrene, the proportion of the modified block copolymer to a standard polystyrene in the chromatogram measured in (6) described above was compared with the proportion of the modified copolymer to a standard polystyrene in a chromatogram measured by a silica column GPC [apparatus: LC-10 (manufactured by SHIMADZU CORPORATION), column: Zorbax (manufactured by Dupont)]. The amount adsorbed to the silica column was measured from the difference therebetween, and this proportion was taken as the number of modified groups per polymerized chain of the modified copolymer.

((10) MFR of Modified Block Copolymer)

The MFR of the modified block copolymer was measured in accordance with ISO 1133 at 230° C. under a load of 2.16 kg.

From the MFR value of the modified block copolymer, the flowability was evaluated based on the following criteria.

ø: The MFR value of the modified block copolymer is 1.0 g/10 min or more

Δ: The MFR value of the modified block copolymer is 0.5 g/10 min or more and less than 1.0 g/10 min x: Less than 0.5 g/10 min Additionally, a ratio of MFR values was calculated by dividing the MRF value of each of Examples and Comparative Examples by the MFR value of an acid-modified product before amine modification.

The MFR values of acid-modified products before amine modification are shown as follows.

(a-2)=3.4 g/10 min
(a-5)=5 g/10 min
(a-11)=5.3 g/10 min
(a-14)=10 g/10 min ((11) MFR of Resin Composition)

<MFR Value of Resin Composition of TPU (Thermoplastic Polyurethane)/Modified Block Copolymer>

The MFR value of a resin composition of TPU/modified block copolymer was measured in accordance with ISO 1133 at 200° C. under a load of 2.16 kg.

<MFR of Resin Composition of TPU/Polyolefin/Modified Block Copolymer>

The MFR value of a resin composition of a TPU/polyolefin/modified block copolymer was measured in accordance with ISO 1133 at 200° C. under a load of 2.16 kg.

From these MFR values, the flowability was evaluated based on the following criteria.

○: The MFR value of a resin composition of the modified block copolymer is 2.0 g/10 min or more and less than 12.0 g/10 min Δ: Less than 2.0 g/10 min x: 12.0 g/10 min or more ((12) Specific Gravity of Resin Composition of Modified Block Copolymer)

The specific gravity at 23° C. was measured in accordance with the A method of JIS K7112.

The light-weightness was evaluated based on the following criteria.

○: The specific gravity of the resin composition is less than 1.21 (specific gravity of the TPU singly)

x: The specific gravity of the resin composition is 1.21 (specific gravity of the TPU singly) or more ((13) Tensile Strength (Tb) and Elongation at Break (Eb))

In accordance with JIS K6251, measurement was performed using a No. 3 dumbbell at a crosshead speed of 500 mm/minute. Three or more specimens for each composition was tested, and the average values thereof were taken as physical property values.

From the mechanical physical properties of the modified block copolymer resin composition, the mechanical physical properties were evaluated based on the following criteria.

<Evaluation of Tb of Resin Composition of TPU/Modified Block Copolymer>

○: Tb of the resin composition of the modified block copolymer is 20 MPa or more Δ: Tb of the resin composition of the modified block copolymer is 15 MPa or more and less than 20 MPa x: Tb of the resin composition of the modified block copolymer is less than 15 MPa <Evaluation of Tb of Resin Composition of TPU/Polyolefin/Modified Block Copolymer>

○: Tb of the resin composition of the modified block copolymer is 14 MPa or more Δ: Tb of the resin composition of the modified block copolymer is 11 MPa or more and less than 14 MPa x: Tb of the resin composition of the modified block copolymer is less than 11 MPa <Evaluation of Eb of the Resin Composition of TPU/Polyolefin/Modified Block Copolymer>

○: Eb of the resin composition of the modified block copolymer is 600% or more

Δ: Eb of the resin composition of the modified block copolymer is 500% or more and less than 600% x: Eb of the resin composition of the modified block copolymer is less than 500%

((14) Abrasion Resistance (Taber Abrasion Test))

Abrasion test on the resin composition of the modified block copolymer was conducted using a Taber type Abrasion Tester (manufactured by TESTER SANGYO CO., LTD., model AB-101) and an abrasion wheel H-22, under a load of 1 kg at 60 rpm. The decrease in the mass of the resin composition of the modified block copolymer was determined by measuring its mass before the test and after 1,000 revolutions.

From the decrease in the mass of the resin composition of the modified block copolymer, the abrasion resistance was evaluated based on the following criteria.

<Evaluation of Taber Abrasion of the Resin Composition of TPU/Modified Block Copolymer>

○: The decrease in the mass of the resin composition of the modified hydrogenated block copolymer is less than 250 mg Δ: The decrease in the mass of the resin composition of the modified hydrogenated block copolymer is 250 mg or more and less than 450 mg x: The decrease in the mass of the resin composition of the modified hydrogenated block copolymer is 450 mg or more <Evaluation of Taber Abrasion of Resin Composition of TPU/Polyolefin (c-1)/Modified Block Copolymer>

○: The decrease in the mass of the resin composition of the modified hydrogenated block copolymer is less than 120 mg Δ: The decrease in the mass of the resin composition of the modified hydrogenated block copolymer is 120 mg or more and less than 200 mg x: The decrease in the mass of the resin composition of the modified hydrogenated block copolymer is 200 mg or more <Evaluation of Taber Abrasion of Resin Composition of TPU/Polyolefin (c-2)/Modified Block Copolymer>

∘: The decrease in the mass of the resin composition of the modified hydrogenated block copolymer is less than 120 mg Δ: The decrease in the mass of the resin composition of the modified hydrogenated block copolymer is 120 mg or more and less than 140 mg ×: The decrease in the mass of the resin composition of the modified hydrogenated block copolymer is 140 mg or more The evaluation criteria of Taber abrasion in the case in which a polyolefin (c-1) is used are different from those in the case in which a polyolefin (c-2) is used. As for (c-1), the requirement for abrasion resistance is relatively low because of its use in parts having relatively low frequency of contact with human and objects. In contrast, (c-2) is used in portions frequently touched by human, such as shift knobs, with its softness taken advantage of, and thus, higher abrasion resistance is required therefrom. On the basis of the background, the evaluation was performed based on the criteria described above.

In the case where the compatibility between the polyolefin and the modified block copolymer is not sufficient in the resin composition of the TPU/polyolefin/modified block copolymer, the TPU or polyolefin, which forms an island phase in the resin composition, may disperse insufficiently depending on the compatibility between the modified group of the modified block copolymer and the TPU, and thus the abrasion resistance deteriorates.

((15) Dynamic Viscoelasticity)

A viscoelasticity measurement apparatus (TA Instruments, Japan, model ARES-G2) was used to measure a storage modulus G'(Pa) by the following method.

The TPU/modified block copolymer was molded into a sheet having a thickness of 2 mm and then cut into a size of 10 mm in width and 35 mm in length as a measurement sample.

By use of the twist type of the viscoelasticity measurement apparatus, measurement was performed under conditions of effective measurement length: 25 mm, strain: 0.5%, frequency: 1 Hz, measurement range: −80° C. to 220° C., and heating rate: 3° C./minute. G'(Pa) at 200° C. was used to evaluate the shape stability at a high temperature.

∘: G'(Pa) is 30,000 Pa or more
Δ: G'(Pa) is 12,000 Pa or more and less than 30,000 Pa
×: G'(Pa) is less than 12,000 Pa The following materials were used to produce a modified block copolymer.

Maleic anhydride (manufactured by FUSO CHEMICAL CO., LTD.)

Radical generator: PERHEXA 25B (manufactured by NOF CORPORATION)

Compound having amine: N-(3-aminopropyl)cyclohexylamine, N-benzylethylenediamine, N,N'-1,6-dimethyl-diaminohexane, 1,6-diaminohexane, N-5-(aminopentyl) acetamide, and 1,3-dimethyl-2-imidazolidinone (all manufactured by Tokyo Chemical Industry Co., Ltd.)

Nylon 6: SF1013A (manufactured by Ube Industries, Ltd.)

Example 1

(Preparation of Hydrogenation Catalyst)

A hydrogenation catalyst used for the hydrogenation reaction of a block copolymer was prepared in the following manner.

To a nitrogen-purged reaction vessel, 1 L of dried and purified cyclohexane was placed, and 100 mmol of bis(η5-cyclopentadienyl)titanium dichloride was added thereto. A n-hexane solution containing 200 mmol of trimethylaluminium was added thereto with sufficient stirring, and a reaction was performed at room temperature for about 3 days to obtain a hydrogenation catalyst.

(Production of Modified Block Copolymer)
<Step 1>

Batch polymerization was performed using a stirred jacketed tank reactor having an internal volume of 10 L.

To the reactor, 1 L of cyclohexane was placed. Then, 0.13 parts by mass of n-butyllithium was added per 100 parts by mass of all monomers, and 0.3 mol of TMEDA (tetramethylethylenediamine) was added per mol of n-butyllithium.

Next, a cyclohexane solution containing 9 parts by mass of butadiene (a concentration of 20% by mass) was added thereto, and polymerization was performed at 70° C. for 20 minutes.

Next, a cyclohexane solution containing 16 parts by mass of styrene (a concentration of 20% by mass) was introduced thereto, and polymerization was performed at 70° C. for 45 minutes.

Next, a cyclohexane solution containing 59 parts by mass of butadiene (a concentration of 20% by mass) was added thereto, and polymerization was performed at 70° C. for an hour.

Next, a cyclohexane solution containing 16 parts by mass of styrene was introduced thereto, and polymerization was performed at 70° C. for 45 minutes.

Next, methanol was added thereto after the reaction was completed to thereby obtain a block copolymer.
<Step 2>

To the block copolymer obtained, the hydrogenation catalyst mentioned above was added so as to achieve a concentration based on titanium of 100 ppm per 100 parts by mass of the block copolymer, and a hydrogenation reaction was performed under a hydrogen pressure of 0.7 MPa at a temperature of 70° C.

After the hydrogenation reaction, 0.3 parts by mass of octadecyl-3-(3,5-di-t-butyl-4-hydroxyphenyl)propionate was added as a stabilizer to the block copolymer to produce an unmodified hydrogenated block copolymer (a-1).

The degree of hydrogenation of the unmodified hydrogenated block copolymer (a-1) obtained was 99 mol %.

The resulting polymer had a styrene content of 32% by mass, an amount of vinyl bonds of the butadiene portion of 36 mol %, a butylene content of 36 mol %, a weight average molecular weight of 75,000, and a molecular weight distribution of 1.2.
<Step 3>

Next, 100 parts by mass of the unmodified hydrogenated block copolymer (a-1) formed into pellets, 0.5 parts by mass of maleic anhydride, and 0.1 parts by mass of PERHEXA 25B were dry-blended and melt-kneaded in a twin screw extruder TEX30 (manufactured by The Japan Steel Works) at a cylinder setting temperature of 210° C., a number of revolutions of the screws of 253 rpm, and a discharge amount of 5 kg/hour to produce a maleic anhydride-modified hydrogenated block copolymer (a-2).

The amount of maleic anhydride added was 0.4 parts by mass based on 100 parts by mass of the unmodified hydrogenated block copolymer (a-1).

The MFR value at 230° C. under a load of 2.16 kg of the maleic anhydride-modified hydrogenated block copolymer (a-2) was 3.4 g/min.
<Step 4>

Next, the maleic anhydride-modified hydrogenated block copolymer (a-2) formed into pellets and N-(3-aminopropyl)

cyclohexylamine (compound containing NHx) in an equimolar amount to the maleic anhydride contained in the (a-2) were dry-blended and melt-kneaded in a twin screw extruder TEX30 (manufactured by The Japan Steel Works) at a cylinder setting temperature of 210° C., a number of revolutions of the screws of 205 rpm, and a discharge amount of 3 kg/hour to produce a modified block copolymer (a-3).

The MFR value at 230° C. under a load of 2.16 kg of the modified block copolymer (a-3) was 3.2 g/min. The reaction ratio between the compound having NHx (x=0 to 2) and the acid anhydride was 100%, and the number of modified groups per polymerized chain was 2.1.

Example 2

In the <Step 4>, N-benzylethylenediamine was used as the "compound having NHx".

While the other conditions were the same as those in [Example 1], a modified block copolymer (a-4) was produced.

The MFR value at 230° C. under a load of 2.16 kg of the modified block copolymer (a-4) was 2.5 g/min. The reaction ratio between the compound having NHx (x=0 to 2) and the acid anhydride was 100%, and the number of modified groups per polymerized chain was 2.1.

Example 3

In the <Step 3>, 2.1 parts by mass of maleic anhydride and 0.12 parts by mass of PERHEXA 25B were used, and the cylinder setting temperature was 180° C. While the other conditions were the same as those in [Example 1], produced was a maleic anhydride-modified hydrogenated block copolymer (a-5), in which the amount of maleic anhydride added was 1.5 parts by mass based on 100 parts by mass of the unmodified hydrogenated block copolymer.

The MFR value at 230° C. under a load of 2.16 kg of the maleic anhydride-modified hydrogenated block copolymer (a-5) was 5.0 g/min.

In the <Step 4>, N-benzylethylenediamine was used. While the other conditions were the same as those in [Example 1], a modified block copolymer (a-6) was produced.

The MFR value at 230° C. under a load of 2.16 kg of the modified block copolymer (a-6) was 5.2 g/min. The reaction ratio between the compound having NHx (x=0 to 2) and the acid anhydride was 100%, and the number of modified groups per polymerized chain was 7.7.

Example 4

In the <Step 4>, N,N'-1,6-dimethyl-diaminohexane was used. While the other conditions were the same as those in [Example 1], a modified block copolymer (a-7) was produced.

The MFR value at 230° C. under a load of 2.16 kg of the modified block copolymer (a-7) was 0.5 g/min. The reaction ratio between the compound having NHx (x=0 to 2) and the acid anhydride was 100%, and the number of modified groups per polymerized chain was 2.1.

Comparative Example 1

In the <Step 4>, 1,6-diaminohexane was used. While the other conditions were the same as those in [Example 1], a modified block copolymer (a-8) was produced.

The MFR value at 230° C. under a load of 2.16 kg of the modified block copolymer (a-8) was 0.1 g/min. The reaction ratio between the compound having NHx (x=0 to 2) and the acid anhydride was 100%, and the number of modified groups per polymerized chain was 2.1.

Example 5

In the <Step 4>, N-5-(aminopentyl)acetamide was used. While the other conditions were the same as those in [Example 1], a modified block copolymer (a-9) was produced.

The MFR value at 230° C. under a load of 2.16 kg of the modified block copolymer (a-9) was 0.9 g/min. The reaction ratio between the compound having NHx (x=0 to 2) and the acid anhydride was 100%, and the number of modified groups per polymerized chain was 7.7.

Example 6

<Step 1>
Batch polymerization was performed using a stirred jacketed tank reactor having an internal volume of 10 L.

To the reactor, 1 L of cyclohexane was placed. Then, 0.12 parts by mass of n-butyllithium was added per 100 parts by mass of all monomers, and 0.33 mol of TMEDA (tetramethylethylenediamine) was added per mol of n-butyllithium.

Next, a cyclohexane solution containing 5 parts by mass of butadiene (a concentration of 20% by mass) was added thereto, and polymerization was performed at 70° C. for 20 minutes.

A cyclohexane solution containing 9.5 parts by mass of styrene (a concentration of 20% by mass) was introduced thereto, and polymerization was performed at 70° C. for 45 minutes.

A cyclohexane solution containing 76 parts by mass of butadiene (a concentration of 20% by mass) was added thereto, and polymerization was performed at 70° C. for an hour.

A cyclohexane solution containing 9.5 parts by mass of styrene was introduced thereto, and polymerization was performed at 70° C. for 45 minutes. Methanol was added thereto after the reaction was completed to thereby obtain a block copolymer.

<Step 2>
To the block copolymer obtained, the hydrogenation catalyst mentioned above was added so as to achieve a concentration based on titanium of 100 ppm per 100 parts by mass of the block copolymer, and a hydrogenation reaction was performed under a hydrogen pressure of 0.7 MPa at a temperature of 70° C.

After the hydrogenation reaction was completed, 0.3 parts by mass of octadecyl-3-(3,5-di-t-butyl-4-hydroxyphenyl) propionate was added as a stabilizer to the block copolymer to produce an unmodified hydrogenated block copolymer (a-10).

The degree of hydrogenation of the unmodified hydrogenated block copolymer (a-10) obtained was 99 mol %.

The resulting polymer had a styrene content of 19% by mass, an amount of vinyl bonds of the butadiene portion of 36 mol %, a butylene content of 36 mol %, a weight average molecular weight of 83,000, and a molecular weight distribution of 1.2.

<Step 3>
Next, 100 parts by mass of the unmodified hydrogenated block copolymer (a-10) formed into pellets, 2.1 parts by mass of maleic anhydride, and 0.12 parts by mass of PERHEXA 25B were dry-blended and melt-kneaded in a twin screw extruder TEX30 (manufactured by The Japan Steel Works) at a cylinder setting temperature of 210° C., a number of revolutions of the screws of 253 rpm, and a discharge amount of 5 kg/hour to produce a maleic anhydride-modified hydrogenated block copolymer (a-11).

The amount of maleic anhydride added was 1.5 parts by mass based on 100 parts by mass of the unmodified hydrogenated block copolymer (a-11). The MFR value at 230° C. under a load of 2.16 kg of the maleic anhydride-modified hydrogenated block copolymer (a-11) was 5.3 g/min.
<Step 4>

Next, the maleic anhydride-modified hydrogenated block copolymer (a-11) formed into pellets and N-benzylethylenediamine (compound having NHx) in an equimolar amount to the maleic anhydride contained in the (a-11) were dry-blended and melt-kneaded in a twin screw extruder TEX30 (manufactured by The Japan Steel Works) at a cylinder setting temperature of 210° C., a number of revolutions of the screws of 205 rpm, and a discharge amount of 3 kg/hour to produce a modified block copolymer (a-12).

The MFR value at 230° C. under a load of 2.16 kg of the modified block copolymer (a-12) was 1.4 g/min. The reaction ratio between the compound having NHx (x=0 to 2) and the acid anhydride was 100%, and the number of modified groups per polymerized chain was 8.4.

Example 7

<Step 1>
Batch polymerization was performed with a stirred jacketed tank reactor having an internal volume of 10 L.

To the reactor, 1 L of cyclohexane was placed. Then, 0.07 parts by mass of n-butyllithium was added per 100 parts by mass of all monomers, 1.8 mol of TMEDA (tetramethylethylenediamine) was added per mol of n-butyllithium, and 0.05 mol of sodium alkoxide was added per mol of n-butyllithium.

Next, a cyclohexane solution containing 5 parts by mass of butadiene (a concentration of 20% by mass) was added thereto, and polymerization was performed at 70° C. for 20 minutes.

Next, a cyclohexane solution containing 7 parts by mass of styrene (a concentration of 20% by mass) was introduced, and polymerization was performed at 70° C. for 45 minutes.

Next, a cyclohexane solution containing 82 parts by mass of butadiene (a concentration of 20% by mass) was added thereto, and polymerization was performed at 50° C. for 80 minutes.

Next, a cyclohexane solution containing 6 parts by mass of styrene was introduced thereto, and polymerization was performed at 70° C. for 45 minutes.

Next, methanol was added thereto after the reaction was completed to thereby obtain a block copolymer.
<Step 2>

To the block copolymer obtained, the hydrogenation catalyst mentioned above was added so as to achieve a concentration based on titanium of 100 ppm per 100 parts by mass of the block copolymer, and a hydrogenation reaction was performed under a hydrogen pressure of 0.7 MPa at a temperature of 70° C.

After the hydrogenation reaction was completed, 0.3 parts by mass of octadecyl-3-(3,5-di-t-butyl-4-hydroxyphenyl) propionate was then added as a stabilizer to the block copolymer to produce an unmodified hydrogenated block copolymer (a-13).

The degree of hydrogenation of the unmodified hydrogenated block copolymer (a-13) obtained was 99 mol %.

The resulting polymer had a styrene content of 13% by mass, an amount of vinyl bonds of the butadiene portion of 78 mol %, a butylene content of 78 mol %, a weight average molecular weight of 150,000, and a molecular weight distribution of 1.2.
<Step 3>

Next, 100 parts by mass of the unmodified hydrogenated block copolymer (a-13) formed into pellets, 1.8 parts by mass of maleic anhydride, and 0.1 parts by mass of PER-HEXA 25B were dry-blended and melt-kneaded in a twin screw extruder TEX30 (manufactured by The Japan Steel Works) at a cylinder setting temperature of 210° C., a number of revolutions of the screws of 253 rpm, and a discharge amount of 5 kg/hour to produce a maleic anhydride-modified hydrogenated block copolymer (a-14).

The amount of maleic anhydride added was 0.9 parts by mass based on 100 parts by mass of the unmodified hydrogenated block copolymer (a-13). The MFR value at 230° C. under a load of 2.16 kg of the maleic anhydride-modified hydrogenated block copolymer (a-14) was 10 g/min.
<Step 4>

Next, the maleic anhydride-modified hydrogenated block copolymer (a-14) formed into pellets and N-benzylethylenediamine (compound having NHx) in an equimolar amount to the maleic anhydride contained in the (a-14) were dry-blended and melt-kneaded in a twin screw extruder TEX30 (manufactured by The Japan Steel Works) at a cylinder setting temperature of 210° C., a number of revolutions of the screws of 205 rpm, and a discharge amount of 3 kg/hour to produce a modified block copolymer (a-15). The MFR value at 230° C. under a load of 2.16 kg of the modified block copolymer (a-15) was 7.0 g/min. The reaction ratio between the compound having NHx (x=0 to 2) and the acid anhydride was 100%, and the number of modified groups per polymerized chain was 8.6.

Example 8

Used was 0.75 molar equivalents of N-benzylethylenediamine (compound having NHx) relative to the maleic anhydride contained in (a-2). While the other conditions were the same as those in [Example 1], a modified block copolymer (a-16) was produced. The MFR value at 230° C. under a load of 2.16 kg of the modified block copolymer (a-16) was 2.4 g/min. The reaction ratio between the compound having NHx (x=0 to 2) and the acid anhydride was 75%, and the number of modified groups per polymerized chain was 1.5.

Comparative Example 2

<Step 1>
Batch polymerization was performed using a stirred jacketed tank reactor having an internal volume of 10 L.

To the reactor, 1 L of cyclohexane was placed. Then, 0.07 parts by mass of n-butyllithium was added per 100 parts by mass of all monomers, 1.8 mol of TMEDA (tetramethylethylenediamine) was added per mol of n-butyllithium, and 0.05 mol of sodium alkoxide was added per mol of n-butyllithium.

Next, a cyclohexane solution containing 5 parts by mass of butadiene (a concentration of 20% by mass) was added thereto, and polymerization was performed at 70° C. for 20 minutes.

Next, a cyclohexane solution containing 7 parts by mass of styrene (a concentration of 20% by mass) was introduced, and polymerization was performed at 70° C. for 45 minutes.

Next, a cyclohexane solution containing 82 parts by mass of butadiene (a concentration of 20% by mass) was added thereto, and polymerization was performed at 50° C. for 80 minutes.

In the end, a cyclohexane solution containing 6 parts by mass of styrene was introduced, and polymerization was performed at 70° C. for 45 minutes.

Next, 1,3-dimethyl-2-imidazolidinone (hereinafter also abbreviated as "DMI") was added in an equimolar amount to 1 mol of n-butyllithium and reacted at 70° C. for 10 minutes.

Next, methanol was added thereto after the reaction was completed to thereby obtain a modified block copolymer by the Step 1.

<Step 2>

To the block copolymer obtained, the hydrogenation catalyst mentioned above was added so as to achieve a concentration based on titanium of 100 ppm per 100 parts by mass of the block copolymer, and a hydrogenation reaction was performed under a hydrogen pressure of 0.7 MPa at a temperature of 70° C.

After the hydrogenation reaction was completed, 0.3 parts by mass of octadecyl-3-(3,5-di-t-butyl-4-hydroxyphenyl) propionate was then added as a stabilizer to the block copolymer to produce a hydrogenated modified block copolymer (a-17).

The hydrogenated modified block copolymer obtained (a-17) had a degree of hydrogenation of 72 mol % and a modification ratio of 65% (number of modified groups per polymerized chain was 0.65).

The resulting polymer had a styrene content of 32% by mass, an amount of vinyl bonds of the butadiene portion of 36 mol %, a butylene content of 36 mol %, a weight average molecular weight of 75,000, and a molecular weight distribution of 1.2.

Comparative Example 3

The maleic anhydride-modified hydrogenated block copolymer (a-5) formed into pellets and polyamide (nylon-6) (compound having NHx) in an equimolar amount to the maleic anhydride contained in the (a-5) were dry-blended and melt-kneaded in a twin screw extruder TEX30 (manufactured by The Japan Steel Works) at a cylinder setting temperature of 275° C., a number of revolutions of the screws of 205 rpm, and a discharge amount of 3 kg/hour to produce a modified block copolymer (a-18). The MFR value at 230° C. under a load of 2.16 kg of the modified block copolymer (a-18) was 0.0 g/min. The number of modified groups per polymerized chain was 7.7.

Example 9

Used was 1.0 molar equivalent of N-(2-aminoethyl)piperazine (compound having NHx) relative to the maleic anhydride contained in (a-2). While the other conditions were the same as those in [Example 1], a modified block copolymer (a-19) was produced. The MFR value at 230° C. under a load of 2.16 kg of the modified block copolymer (a-19) was 1.6 g/min. The reaction ratio between the compound having NHx (x=0 to 2) and the acid anhydride was 100%, and the number of modified groups per polymerized chain was 2.1.

[Production of Resin Composition Containing Modified Block Copolymer]

Resin compositions were produced on the basis of the amount to be blended for [Examples 10 to 45] and [Comparative Examples 4 to 14] (in "parts by mass") described in the following Tables, and molded sheets therefrom were further produced.

Unmodified hydrogenated block copolymer: a-1
Modified block copolymers: a-3, a-4, a-6, a-7, a-8, a-9, a-12, a-15, a-16, a-17, a-18, and a-19
TPU: Elastollan ET-685 (manufactured by BASF Japan Ltd., specific gravity: 1.21) (b-1)
TPU: Elastollan ET-385 (manufactured by BASF Japan Ltd., specific gravity: 1.12) (b-2)
Polyolefin: block polypropylene PM472W (manufactured by SunAllomer Ltd.) (c-1)
Polyolefin: low density polyethylene Suntec M2115 (manufactured by Asahi Kasei Corporation) (c-2)

In the following Tables, the TPU is referred to as "ET-685 (b-1)" or "ET-385 (b-2)", and the polyolefin is referred to as "PM472W (c-1)" or "M2115 (c-2)".

Examples 10 and 12

The modified block copolymers (a-4) and (b-1) were dry-blended and melt-kneaded in a twin screw extruder TEX30 (manufactured by The Japan Steel Works) at a cylinder setting temperature of 200° C., a number of revolutions of the screws of 253 rpm, and a discharge amount of 5 kg/hour to produce a resin composition.

Then, the resin composition was rolled out at 170° C. using a 4-inch roll, and then, press molding was performed using a hydraulic press at 200° C. and 100 kg/cm$^2$ to produce a 2 mm-thick molded sheet.

Examples 11 and 13

The modified block copolymer (a-6) was used. While the other conditions were the same as those in [Examples 10 and 12], a 2 mm-thick molded sheet was produced.

Comparative Examples 4 and 5

The unmodified hydrogenated block copolymer (a-1) was used. While the other conditions were the same as those in [Examples 10 and 12], a 2 mm-thick molded sheet was produced.

Examples 14, 24, 25, 26, 20, 33, and 34

The modified block copolymers (a-3), (b-1), and (c-1) or (c-2) were dry-blended and melt-kneaded in a twin screw extruder TEX30 (manufactured by The Japan Steel Works) at a cylinder setting temperature of 200° C., a number of revolutions of the screws of 253 rpm, and a discharge amount of 5 kg/hour to produce a resin composition.

Then, the resin composition was rolled out at 170° C. using a 4-inch roll, and then, press molding was performed using a hydraulic press at 200° C. and 100 kg/cm$^2$ to produce a 2 mm-thick molded sheet.

Examples 15, 27, 28, 29, 21, 35, and 36

The modified block copolymer (a-4) was used.
While the other conditions were the same as those in [Examples 14, 24, 25, 26, 20, 33, and 34], a 2 mm-thick molded sheet was produced.

Examples 16, 30, 31, 32, 22, 37, and 38

The modified block copolymer (a-6) was used. While the other conditions were the same as those in [Examples 14, 24, 25, 26, 20, 33, and 34], a 2 mm-thick molded sheet was produced.

Examples 17 and 39

The modified block copolymer (a-8) was used. While the other conditions were the same as those in [Examples 14 and 33], a 2 mm-thick molded sheet was produced.

Example 18

The modified block copolymer (a-9) was used. While the other conditions were the same as those in [Example 14], a 2 mm-thick molded sheet was produced.

Examples 19, 23, 40, and 41

The modified block copolymer (a-12) was used. While the other conditions were the same as those in [Examples 14, 20, 33 and 34], a 2 mm-thick molded sheet was produced.

Example 42

The modified block copolymer (a-16) was used. While the other conditions were the same as those in [Example 33], a 2 mm-thick molded sheet was produced.

Example 43

The modified block copolymer (a-4) was used. While the other conditions were the same as those in [Example 33], a 2 mm-thick molded sheet was produced.

Example 44

The modified block copolymers (a-4) and (b-2) were used. While the other conditions were the same as those in [Example 33], a 2 mm-thick molded sheet was produced.

Example 45

The modified block copolymers (a-19) and (b-2) were used. While the other conditions were the same as those in [Example 33], a 2 mm-thick molded sheet was produced.

Comparative Examples 6, 9, 10, 11, 12, 13, and 14

The unmodified hydrogenated block copolymer (a-1) was used. While the other conditions were the same as those in [Examples 14, 24, 25, 26, 33, 34, and 44], a 2 mm-thick molded sheet was produced.

Comparative Example 7

The modified block copolymer (a-17) was used. While the other conditions were the same as those in [Example 14], a 2 mm-thick molded sheet was produced.

Comparative Example 8

The modified block copolymer (a-18) was used. While the other conditions were the same as those in [Example 14], a 2 mm-thick molded sheet was produced.

TABLE 1

| | | Example 1 | Example 2 | Example 3 | Example 4 | Comparative Example 1 | Example 5 |
|---|---|---|---|---|---|---|---|
| Modified block copolymer | | a-3 | a-4 | a-6 | a-7 | a-8 | a-9 |
| Maleic anhydride-modified hydrogenated block copolymer | | a-2 | a-2 | a-5 | a-2 | a-2 | a-5 |
| Compound having NHx (x = 0 to 2) | | N-(3-Amino-propyl)cyclo-hexylamine | N-Benzyl-ethylene diamine | N-Benzyl-ethylene diamine | N,N'-1,6-Dimethyl-diamino-hexane | 1,6-Diamino-hexane | N-5-(Amino-pentyl)acetamide |
| Molar ratio of maleic acid/amine compound in maleic anhydride-modified hydrogenated block copolymer | | 1:1 | 1:1 | 1:1 | 1:1 | 1:1 | 1:1 |
| MFR (230° C., 2.16 kg) | g/10 min | 3.2 | 2.5 | 5.2 | 0.5 | 0.1 | 0.9 |
| MFR (230° C., 2.16 kg) | Ratio | 0.94 | 0.74 | 1.04 | 0.15 | 0.03 | 0.18 |
| MFR (230° C., 2.16 kg) | Evaluation | ○ | ○ | ○ | Δ | x | ○ |
| Number of modified groups per polymerized chain | Number/chain | 2.1 | 2.1 | 7.7 | 2.1 | 2.1 | 7.7 |
| Side chain or terminal | Evaluation: side chain ○/terminal x | ○ | ○ | ○ | ○ | ○ | ○ |
| R1/R2 | R1/R2 | C3/C6 | C2/C7 | C2/C7 | C6/C1 | C6/C0 | C5/C2 |
| Styrene content | | 32 | 32 | 32 | 32 | 32 | 32 |
| Amount of vinyl bonds | | 36 | 36 | 36 | 36 | 36 | 36 |

TABLE 2

| | Example 6 | Example 7 | Example 8 | Comparative Example 2 | Comparative Example 3 | Example 9 |
|---|---|---|---|---|---|---|
| Modified block copolymer | a-12 | a-15 | a-16 | a-17 | a-18 | a-19 |
| Maleic anhydride-modified hydrogenated block copolymer | a-11 | a-14 | a-2 | — | a-5 | a-2 |

TABLE 2-continued

|  |  | Example 6 | Example 7 | Example 8 | Comparative Example 2 | Comparative Example 3 | Example 9 |
|---|---|---|---|---|---|---|---|
| Compound having NHx (x = 0 to 2) |  | N-Benzyl-ethylene diamine | N-Benzyl-ethylene diamine | N-Benzyl-ethylene diamine | DMI | PA | N-(2-Amino-ethyl)piperazine |
| Molar ratio of maleic acid/amine compound in maleic anhydride-modified hydrogenated block copolymer |  | 1:1 | 1:1 | 1:0.75 | — | 1:1 | 1:1 |
| MFR (230° C., 2.16 kg) | g/10 min | 1.4 | 7 | 2.4 | 3.5 | 0 | 1.6 |
| MFR (230° C., 2.16 kg) | Ratio | 0.26 | 0.70 | 0.71 | — | 0.00 | 0.47 |
| MFR (230° C., 2.16 kg) | Evaluation | ○ | ○ | ○ | — | x | ○ |
| Number of modified groups per polymerized chain | Number/chain | 8.4 | 8.6 | 1.5 | 0.7 | 7.7 | 2.1 |
| Side chain or terminal | Evaluation: side chain ○/terminal x | ○ | ○ | ○ | x | ○ | ○ |
| R1/R2 | R1/R2 | C2/C7 | C2/C7 | C2/C7 | C4/C1 | C6/C14 or more | C4/C2 |
| Styrene content |  | 19 | 13 | 32 | 32 | 32 | 32 |
| Amount of vinyl bonds |  | 36 | 78 | 36 | 36 | 36 | 36 |

TABLE 3

|  |  | Example 10 | Example 11 | Comparative Example 4 |
|---|---|---|---|---|
| Modified block copolymer |  | a-4 | a-6 | a-1 |
| Modified block copolymer | % by mass | 50.0 | 50.0 | 50.0 |
| ET-685 (b-1) | % by mass | 50.0 | 50.0 | 50.0 |
| PM472W (c-1) | % by mass | 0.0 | 0.0 | 0.0 |
| Specific gravity |  | 1.06 | 1.06 | 1.05 |
| Specific gravity | Evaluation | ○ | ○ | ○ |
| MFR (200° C., 2.16 kg) | g/10 min | 2.8 | 1.8 | 10.6 |
| Tensile strength (Tb) (average value) | MPa | 20 | 16 | 14 |
| Tensile strength (Tb) (average value) | Evaluation | ○ | Δ | x |
| Taber abrasion | mg | 365 | 250 | 1095 |
| Taber abrasion | Evaluation | Δ | ○ | x |
| 200° C. G' (Pa) | Pa | 37486 | 67042 | 10920 |
| 200° C. G' (Pa) | Evaluation | Δ | ○ | x |
| MFR (200° C., 2.16 kg) | Evaluation | ○ | Δ | x |

TABLE 4

|  |  | Example 12 | Example 13 | Comparative Example 5 |
|---|---|---|---|---|
| Modified block copolymer |  | a-4 | a-6 | a-1 |
| Modified block copolymer | % by mass | 25.0 | 25.0 | 25.0 |
| ET-685 (b-1) | % by mass | 75.0 | 75.0 | 75.0 |
| PM472W (c-1) | % by mass | 0.0 | 0.0 | 0.0 |
| Specific gravity | Evaluation | ○ | ○ | ○ |
| Tensile strength (Tb) (average value) | Evaluation | ○ | ○ | ○ |
| Taber abrasion | Evaluation | ○ | ○ | x |
| 200° C. G' (Pa) | Evaluation | Δ | Δ | x |
| MFR (200° C., 2.16 kg) | Evaluation | ○ | ○ | x |

TABLE 5

|  |  | Example 14 | Example 15 | Example 16 | Example 17 | Example 18 | Example 19 |
|---|---|---|---|---|---|---|---|
| Modified block copolymer |  | a-3 | a-4 | a-6 | a-8 | a-9 | a-12 |
| Modified block copolymer | % by mass | 10.0 | 10.0 | 10.0 | 10.0 | 10.0 | 10.0 |
| ET-685 (b-1) | % by mass | 67.5 | 67.5 | 67.5 | 67.5 | 67.5 | 67.5 |
| PM472W (c-1) | % by mass | 22.5 | 22.5 | 22.5 | 22.5 | 22.5 | 22.5 |
| Specific gravity |  | 1.1 | 1.1 | 1.1 | 1.1 | 1.1 | 1.1 |
| Specific gravity | Evaluation | ○ | ○ | ○ | ○ | ○ | ○ |
| MFR (200° C., 2.16 kg) | g/10 min | 8.3 | 7.3 | 2.1 | 7.0 | 8.3 | 1.2 |
| MFR (200° C., 2.16 kg) | Evaluation | ○ | ○ | ○ | ○ | ○ | ○ |
| Tensile strength (Tb) (average value) | MPa | 15.1 | 14.8 | 13.0 | 14.9 | 18.3 | 13.0 |
| Tensile strength (Tb) (average value) | Evaluation | ○ | ○ | Δ | ○ | ○ | Δ |
| Elongation at break (Eb) (average value) | % | 643 | 638 | 593 | 535 | 580 | 665 |
| Elongation at break (Eb) (average value) | Evaluation | ○ | ○ | Δ | Δ | ○ | ○ |
| Taber abrasion | mg | 97.9 | 81.4 | 102.3 | 310 | 184 | 99.8 |
| Taber abrasion | Evaluation | ○ | ○ | ○ | x | Δ | ○ |

TABLE 6

|  |  | Example 20 | Example 21 | Example 22 | Example 23 | Comparative Example 6 | Comparative Example 7 | Comparative Example 8 |
|---|---|---|---|---|---|---|---|---|
| Modified block copolymer |  | a-3 | a-4 | a-6 | a-12 | a-1 | a-17 | a-18 |
| Modified block copolymer | % by mass | 5.0 | 5.0 | 5.0 | 5.0 | 10.0 | 10.0 | 10.0 |
| ET-685 (b-1) | % by mass | 71.25 | 71.25 | 71.25 | 71.25 | 67.5 | 67.5 | 67.5 |
| PM472W (c-1) | % by mass | 23.75 | 23.75 | 23.75 | 23.75 | 22.5 | 22.5 | 22.5 |
| Specific gravity |  | 1.1 | 1.1 | 1.1 | 1.1 | 1.1 | 1.1 | 1.1 |
| Specific gravity | Evaluation | ○ | ○ | ○ | ○ | ○ | ○ | ○ |
| MFR (200° C., 2.16 kg) | g/10 min | 9.9 | 8.3 | 4.5 | 3.9 | 12.3 | 26.2 | 13.0 |
| MFR (200° C., 2.16 kg) | Evaluation | ○ | ○ | ○ | ○ | x | x | x |
| Tensile strength (Tb) (average value) | MPa | 14.0 | 14.0 | 14.1 | 14.7 | 10.4 | 11.2 | 12.3 |
| Tensile strength (Tb) (average value) | Evaluation | ○ | ○ | ○ | ○ | x | Δ | Δ |
| Elongation at break (Eb) (average value) | % | 588 | 595 | 655 | 603 | 485 | 495 | 480 |
| Elongation at break (Eb) (average value) | Evaluation | Δ | ○ | ○ | ○ | x | x | x |
| Taber abrasion | mg | 113.3 | 92.5 | 96 | 102.4 | 573 | 156 | 250 |
| Taber abrasion | Evaluation | ○ | ○ | ○ | ○ | x | Δ | x |

TABLE 7

|  |  | Example 24 | Example 25 | Example 26 | Example 27 | Example 28 | Example 29 |
|---|---|---|---|---|---|---|---|
| Modified block copolymer |  | a-3 | a-3 | a-3 | a-4 | a-4 | a-4 |
| Modified block copolymer | % by mass | 6.0 | 6.0 | 32.0 | 6.0 | 6.0 | 32.0 |
| ET-685 (b-1) | % by mass | 82.0 | 56.0 | 56.0 | 82.0 | 56.0 | 56.0 |
| PM472W (c-1) | % by mass | 12.0 | 38.0 | 12.0 | 12.0 | 38.0 | 12.0 |
| Specific gravity |  | 1.15 | 1.07 | 1.08 | 1.15 | 1.07 | 1.08 |
| Specific gravity | Evaluation | ○ | ○ | ○ | ○ | ○ | ○ |
| MFR (200° C., 2.16 kg) | Evaluation | ○ | Δ | Δ | ○ | Δ | Δ |
| Tensile strength (Tb) (average value) | Evaluation | ○ | Δ | Δ | ○ | Δ | Δ |
| Elongation at break (Eb) (average value) | Evaluation | ○ | Δ | Δ | ○ | Δ | Δ |
| Taber abrasion | Evaluation | ○ | Δ | Δ | ○ | Δ | Δ |

TABLE 8

|  |  | Example 30 | Example 31 | Example 32 | Comparative Example 9 | Comparative Example 10 | Comparative Example 11 |
|---|---|---|---|---|---|---|---|
| Modified block copolymer |  | a-6 | a-6 | a-6 | a-1 | a-1 | a-1 |
| Modified block copolymer | % by mass | 6.0 | 6.0 | 32.0 | 6.0 | 6.0 | 32.0 |
| ET-685 (b-1) | % by mass | 82.0 | 56.0 | 56.0 | 82.0 | 56.0 | 56.0 |
| PM472W (c-1) | % by mass | 12.0 | 38.0 | 12.0 | 12.0 | 38.0 | 12.0 |
| Specific gravity |  | 1.15 | 1.07 | 1.08 | 1.15 | 1.07 | 1.08 |
| Specific gravity | Evaluation | ○ | ○ | ○ | ○ | ○ | ○ |
| MFR (200° C., 2.16 kg) | Evaluation | Δ | ○ | Δ | Δ | x | Δ |
| Tensile strength (Tb) (average value) | Evaluation | ○ | Δ | Δ | Δ | x | x |
| Elongation at break (Eb) (average value) | Evaluation | Δ | Δ | Δ | x | x | x |
| Taber abrasion | Evaluation | ○ | Δ | Δ | x | x | x |

TABLE 9

|  |  | Example 33 | Example 34 | Example 35 | Example 36 | Example 37 | Example 38 |
|---|---|---|---|---|---|---|---|
| Modified block copolymer |  | a-3 | a-3 | a-4 | a-4 | a-6 | a-6 |
| Modified block copolymer | % by mass | 10.0 | 10.0 | 10.0 | 10.0 | 10.0 | 10.0 |
| ET-685 (b-1) | % by mass | 67.5 | 55.0 | 67.5 | 55.0 | 67.5 | 55.0 |
| M2115 (c-2) | % by mass | 22.5 | 35.0 | 22.5 | 35.0 | 22.5 | 35.0 |

TABLE 9-continued

| | | Example/Comparative Example | | | | | |
|---|---|---|---|---|---|---|---|
| | | Example 33 | Example 34 | Example 35 | Example 36 | Example 37 | Example 38 |
| Specific gravity | | 1.1 | 1.1 | 1.1 | 1.1 | 1.1 | 1.1 |
| Specific gravity | Evaluation | ○ | ○ | ○ | ○ | ○ | ○ |
| MFR (200° C., 2.16 kg) | g/10 min | 10.1 | 7.0 | 6.4 | 4.8 | 5.8 | 4.1 |
| MFR (200° C., 2.16 kg) | Evaluation | ○ | ○ | ○ | ○ | ○ | ○ |
| Tensile strength (Tb) (average value) | MPa | 22.4 | 20.5 | 24.9 | 22.0 | 20.7 | 18.2 |
| Tensile strength (Tb) (average value) | Evaluation | ○ | ○ | ○ | ○ | ○ | ○ |
| Elongation at break (Eb) (average value) | % | 683 | 648 | 665 | 619 | 658 | 625 |
| Elongation at break (Eb) (average value) | Evaluation | ○ | ○ | ○ | ○ | ○ | ○ |
| Taber abrasion | mg | 98 | 133 | 75 | 97 | 81.9 | 110 |
| Taber abrasion | Evaluation | ○ | Δ | ○ | ○ | ○ | Δ |

TABLE 10

| | | Example/Comparative Example | | | | | | |
|---|---|---|---|---|---|---|---|---|
| | | Example 39 | Example 40 | Example 41 | Example 42 | Comparative Example 12 | Comparative Example 13 | Example 43 |
| Modified block copolymer | | a-8 | a-12 | a-12 | a-16 | a-1 | a-1 | a-19 |
| Modified block copolymer | % by mass | 10.0 | 10.0 | 10.0 | 10.0 | 10.0 | 10.0 | 10.0 |
| ET-685 (b-1) | % by mass | 67.5 | 67.5 | 55.0 | 67.5 | 67.5 | 55.0 | 67.5 |
| M2115 (c-2) | % by mass | 22.5 | 22.5 | 35.0 | 22.5 | 22.5 | 35.0 | 22.5 |
| Specific gravity | | 1.1 | 1.1 | 1.1 | 1.1 | 1.1 | 1.1 | 1.1 |
| Specific gravity | Evaluation | ○ | ○ | ○ | ○ | ○ | ○ | ○ |
| MFR (200° C., 2.16 kg) | g/10 min | 13.0 | 1.8 | 1.4 | 4.8 | 9.1 | 9.1 | 5.6 |
| MFR (200° C., 2.16 kg) | Evaluation | x | ○ | ○ | ○ | ○ | ○ | ○ |
| Tensile strength (Tb) (average value) | MPa | 16.4 | 19.2 | 16.6 | 25.7 | 20.0 | 17.4 | 25.7 |
| Tensile strength (Tb) (average value) | Evaluation | ○ | ○ | ○ | ○ | ○ | ○ | ○ |
| Elongation at break (Eb) (average value) | % | 653 | 693 | 658 | 660 | 550 | 518 | 688 |
| Elongation at break (Eb) (average value) | Evaluation | ○ | ○ | ○ | ○ | Δ | Δ | ○ |
| Taber abrasion | mg | 131.2 | 85.9 | 117 | 52.5 | 140.7 | 215 | 47.2 |
| Taber abrasion | Evaluation | Δ | ○ | Δ | ○ | x | x | ○ |

TABLE 11

| | | Example/Comparative Example | | |
|---|---|---|---|---|
| | | Example 44 | Comparative Example 14 | Example 45 |
| Modified block copolymer | | a-4 | a-1 | a-19 |
| Modified block copolymer | % by mass | 10.0 | 10.0 | 10.0 |
| ET-385 (b-2) | % by mass | 67.5 | 67.5 | 67.5 |
| M2115 (c-2) | % by mass | 22.5 | 22.5 | 22.5 |
| Specific gravity | | 1.0 | 1.0 | 1.0 |
| Specific gravity | Evaluation | ○ | ○ | ○ |
| MFR (200° C., 2.16 kg) | g/10 min | 8.9 | 10.6 | 10.4 |
| MFR (200° C., 2.16 kg) | Evaluation | ○ | ○ | ○ |
| Tensile strength (Tb) (average value) | MPa | 18.9 | 17.6 | 18.5 |
| Tensile strength (Tb) (average value) | Evaluation | ○ | ○ | ○ |
| Elongation at break (Eb) (average value) | % | 693 | 680 | 755 |
| Elongation at break (Eb) (average value) | Evaluation | ○ | ○ | ○ |
| Taber abrasion | mg | 133 | 1180 | 78.9 |
| Taber abrasion | Evaluation | Δ | x | ○ |

The modified block copolymers obtained in Examples 1 to 9 had good flowability. The resin compositions of Examples 10 to 45 obtained using the modified block copolymers of Examples 1 to 9 had well-balanced mechanical strength and abrasion resistance, which are features of TPU.

In contrast, the resin compositions of Comparative Examples 4 to 14 resulted in poor-balanced mechanical strength and abrasion resistance.

The present application is based on a Japanese patent application (Japanese Patent Application No. 2017-095959) filed with the Japanese Patent Office on May 12, 2017, the content of which is incorporated herein by reference.

INDUSTRIAL APPLICABILITY

The composition containing a thermoplastic polyurethane of the present invention has well-balanced mechanical strength and abrasion resistance, which are features of TPU, and has a lighter weight. The composition containing a thermoplastic polyurethane the present invention, as having excellent properties described above, has industrial applicability in applications such as automotive parts (such instrument panel skins, gear knob skins, console box skins, leather seats, bumper side molding, tail lamp seal, snow chains, bushes, dust covers, gears, sealants, bearings, caps, ball joints, pedal stoppers, door lock strikers, spring covers, and vibration-isolating parts), industrial parts (such as various gears, various grips, solid tires, casters, rollers, vibration-isolating and sound-insulating parts, pickers, bushes, bearings, slip stoppers, building materials, gears, sealing materials, packings, caps, watch belts, typewriter parts, connectors, rubber screens, printing drums, grease covers, hammers, dust covers, sieve parts, and ball joints), hoses (high-pressure hoses, fire hoses, pneumatic tubing, hydraulic tubing, agricultural hoses, and painting hoses), tubes (such as fuel tubes, dialysis tubes, arterial and intravenous tubes, and cardiac tubes), films (such as scratch-resistant films, flexible films, packaging buffer films, and medical surgical films), sheets (such as air mats, nursing bed sheets, diaphragms, keyboard sheets, rubber screens, conveyor belts, gaskets, synthetic leather, artificial leather, stretchable sheets, tarpaulins, medical, life jackets, wet suits, and diaper articles), belts (such as conveyor belts, timing belts, round belts, V-belts, and flat belts), consumer electrical appliances, wire cables (such as electric power and communication cables, automobile ABS sensor cables, robot cables, industrial cables, and computer wiring), medical supplies (such as dressing materials, catheters, robes, and adhesive bandages), sanitary articles, sporting goods (such as sports shoes, mountain-climbing shoes, ski shoes, ski boards, snowboards, motocross boots, golf ball covers, and fins), industrial articles, adhesives, coating materials, binders, sealing materials, and other sundry goods.

The invention claimed is:

1. A resin composition comprising a modified block copolymer and a thermoplastic polyurethane, wherein the modified block copolymer comprises:
   a polymer block comprising a vinyl aromatic compound as a main constituent (A),
   a polymer block comprising a conjugate diene compound (B), and
   an atomic group having NHx (x=0 to 2) (C), wherein
   the polymer block comprising a conjugate diene compound as a main constituent (B) is a hydrogenated product,
   the atomic group having NHx (x=0 to 2) (C) is contained in a side chain, and
   a compound forming the atomic group having NHx (x=0 to 2) (C) satisfies the following condition:
   Condition: when the compound forming the atomic group having NHx (x=0 to 2) (C) is reacted with a maleic anhydride-modified group in a maleic anhydride-modified block copolymer, a MFR value at 230° C. under a load of 2.16 kg of the modified block copolymer after the reaction is 0.1 times or more a MFR value at 230° C. under a load of 2.16 kg of the maleic anhydride-modified block copolymer before the reaction,
   wherein the atomic group having NHx (x=0 to 2) (C) has a structure of X-R1-NH-R2, R1 is a C2-C22 substituted or unsubstituted, saturated or unsaturated hydrocarbon group, R2 is a C2-C13 substituted or unsubstituted, saturated or unsaturated hydrocarbon group, and X has a structure in which a carbon-carbon unsaturated bond forms a chemical bond with the polymer block (A) and/or the polymer block (B) via graft modification.

2. The resin composition according to claim 1, wherein the number of the atomic group having NHx (x=0 to 2) (C) per polymerized chain exceeds 1.

3. The resin according to claim 1, wherein
   a content of the polymer block comprising a vinyl aromatic compound as a main constituent (A) is 1 to 70% by mass, and
   an amount of vinyl bonds before hydrogenation of the polymer block comprising a conjugate diene compound as a main constituent (B) is 20 to 100 mol %.

4. The resin composition according to claim 1, wherein a hydrogenation rate of the polymer block comprising a conjugate diene compound as a main constituent (B) is 40 to 100 mol %.

5. The resin composition according to claim 1, wherein a butylene content and/or a propylene content is 25 to 100 mol % based on 100 mol % in total of a conjugate diene compound unit(s).

6. The resin composition according to claim 1, wherein
   the atomic group having NHx (x=0 to 2) (C) is bonded to the polymer block comprising a vinyl aromatic compound as a main constituent (A) and/or the polymer block comprising a conjugate diene compound as a main constituent (B) via an imide group and/or an amide group contained in the atomic group (C).

7. The resin composition according to claim 1, wherein the compound having NHx (x=0 to 2) that forms the atomic group having NHx (x=0 to 2) (C) satisfies the following condition:
   Condition: when a maleic anhydride modified group in a maleic anhydride-modified block copolymer is reacted with an equimolar amount of $H_2N$—R—NHx (x=0 to 2, R is a C2-C22 substituted or unsubstituted, saturated or unsaturated hydrocarbon group), which is the compound having NHx (x=0 to 2), the MFR value at 230° C. under a load of 2.16 kg of the modified block copolymer after the reaction is 0.1 times or more the MFR value at 230° C. under a load of 2.16 kg of the maleic anhydride-modified block copolymer before the reaction.

8. The resin composition according to claim 1, wherein the atomic group having NHx (x=0 to 2) (C) has a structure of X—R1-NH—R2,
   R1 is a C2-C22 hydrocarbon group, the C2-C22 hydrocarbon group being a substituted or unsubstituted, saturated or unsaturated hydrocarbon group,
   R2 is a C2-C13 hydrocarbon group, the C2-C13 hydrocarbon group being a substituted or unsubstituted, saturated or unsaturated hydrocarbon group, and
   X has a structure in which a vinyl or an α,β-unsaturated carboxylic acid derivative forms a chemical bond with the polymer block (A) and/or the polymer block (B) via graft modification.

9. A method for producing the resin composition according to claim 1, comprising:
   a step of graft-adding an α,β-unsaturated carboxylic acid and/or a derivative thereof to a block copolymer having a polymer block comprising a vinyl aromatic compound as a main constituent (A) and a polymer block comprising a conjugate diene compound as a main constituent (B); and
   a step of reacting an asymmetric diamine with the α,β-unsaturated carboxylic acid and/or a derivative thereof.

10. The method for producing the resin composition according to claim 9, wherein one terminal of the asymmetric diamine is a secondary amine.

11. The method for producing the resin composition according to claim 10, wherein a substituent of the secondary amine is a C2 or higher, substituted or unsubstituted, saturated or unsaturated hydrocarbon group.

12. The resin composition according to claim 1, comprising:
   1 to 70% by mass of the modified block copolymer and
   30 to 99% by mass of the thermoplastic polyurethane.

13. A resin composition according to claim 1, further comprising a polyolefin.

14. The resin composition according to claim 13, comprising:
- 1 to 98% by mass of the modified block copolymer,
- 1 to 98% by mass of the thermoplastic polyurethane, and
- 1 to 98% by mass of the polyolefin.

15. A resin composition comprising:
- 1 to 98% by mass of a modified block copolymer comprising a polymer block comprising a vinyl aromatic compound as a main constituent (A), a polymer block comprising a conjugate diene compound as a main constituent (B), and an atomic group (C) having NHx (x=1),
- 1 to 98% by mass of a thermoplastic polyurethane, and
- 1 to 98% by mass of a polyolefin, wherein the polymer block comprising a conjugate diene compound as a main constituent (B) is a hydrogenated product, the atomic group having NHx (x=1) (C) has a structure of X—R1-NH—R2, R1 is a C2-C22 substituted or unsubstituted, saturated or unsaturated hydrocarbon group, R2 is a C2-C13 substituted or unsubstituted, saturated or unsaturated hydrocarbon group, X has a structure in which a carbon-carbon unsaturated bond forms a chemical bond with the polymer block (A) and/or the polymer block (B) via graft modification, and a compound having NHx (x=0 to 2) that forms the atomic group having NHx (x=0 to 2) (C) satisfies the following condition:

Condition: when a maleic anhydride modified group in a maleic anhydride-modified block copolymer is reacted with an equimolar amount of $H_2N$—R—NHx (x=0 to 2, R is a C2-C22 substituted or unsubstituted, saturated or unsaturated hydrocarbon group), which is the compound having NHx (x=0 to 2), a MFR value at 230° C. under a load of 2.16 kg of the modified block copolymer after the reaction is 0.1 times or more a MFR value at 230° C. under a load of 2.16 kg of the maleic anhydride-modified block copolymer before the reaction.

* * * * *